(12) United States Patent
Karlsson

(10) Patent No.: US 11,724,182 B2
(45) Date of Patent: *Aug. 15, 2023

(54) DYNAMIC STREAMING VIDEO GAME CLIENT

(71) Applicant: Electronic Arts Inc., Redwood City, CA (US)

(72) Inventor: Per Henrik Benny Karlsson, North Vancouver (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/175,530

(22) Filed: Feb. 12, 2021

(65) Prior Publication Data
US 2021/0236923 A1 Aug. 5, 2021

Related U.S. Application Data

(63) Continuation of application No. 16/370,707, filed on Mar. 29, 2019, now Pat. No. 10,918,938.

(51) Int. Cl.
*A63F 13/00* (2014.01)
*A63F 13/355* (2014.01)
*A63F 13/352* (2014.01)

(52) U.S. Cl.
CPC .......... *A63F 13/355* (2014.09); *A63F 13/352* (2014.09); *A63F 2300/538* (2013.01)

(58) Field of Classification Search
CPC .............. A63F 13/355; A63F 13/352; A63F 2300/538; A63F 2300/60; A63F 2300/534
See application file for complete search history.

(56) References Cited

U.S. PATENT DOCUMENTS

| | | | |
|---|---|---|---|
| 5,953,506 A | 9/1999 | Kalra et al. | |
| 6,421,058 B2 | 7/2002 | Parikh et al. | |
| 6,570,564 B1 | 5/2003 | Sowizral et al. | |
| 6,631,403 B1 | 10/2003 | Deutsch et al. | |
| 6,636,214 B1 | 10/2003 | Leather et al. | |
| 7,100,020 B1 | 8/2006 | Brightman et al. | |
| 7,159,217 B2* | 1/2007 | Pulsipher | G06F 9/4881 |
| | | | 718/100 |
| 7,796,155 B1 | 9/2010 | Neely, III et al. | |
| 8,171,461 B1 | 5/2012 | Kilgard et al. | |
| 8,200,796 B1 | 6/2012 | Margulis | |
| 8,266,213 B2 | 9/2012 | Crowder | |
| 8,319,825 B1 | 11/2012 | Urbach | |
| 8,341,550 B2 | 12/2012 | de Heer | |
| 8,719,336 B2 | 5/2014 | Douceur et al. | |
| 9,094,667 B1 | 7/2015 | Hejl | |
| 9,374,552 B2 | 6/2016 | Taraki et al. | |

(Continued)

OTHER PUBLICATIONS

Ito, Asynch Queue, 2012, in 7 pages.

*Primary Examiner* — Dmitry Suhol
*Assistant Examiner* — Jason Pinheiro
(74) *Attorney, Agent, or Firm* — Knobbe, Martens, Olson & Bear, LLP

(57) ABSTRACT

Embodiments of the present application provide a phased streaming system and process using a dynamic video game client. The dynamic video game client can utilize a state stream game engine in combination with a game application streaming service to provide users with the ability to begin playing games quickly on a huge range of devices.

20 Claims, 10 Drawing Sheets

(56) References Cited

U.S. PATENT DOCUMENTS

| | | |
|---|---|---|
| 9,415,304 B2 | 8/2016 | Harp et al. |
| 9,694,281 B2 | 7/2017 | Garden |
| 9,700,789 B2 | 7/2017 | Cotter |
| 9,795,879 B2 | 10/2017 | Colenbrander |
| 10,127,082 B2 | 11/2018 | Hejl, Jr. et al. |
| 10,179,290 B2 | 1/2019 | Benedetto |
| 10,296,391 B2 | 5/2019 | Justice et al. |
| 10,315,113 B2 * | 6/2019 | Marr .................. A63F 13/60 |
| 10,376,781 B2 * | 8/2019 | Marr .................. H04L 65/1089 |
| 10,403,022 B1 | 9/2019 | Silva et al. |
| 10,537,799 B1 | 1/2020 | Burke |
| 10,589,171 B1 | 3/2020 | Burke |
| 10,870,060 B2 | 12/2020 | Benedetto |
| 10,896,063 B2 | 1/2021 | Hejl, Jr. et al. |
| 10,918,938 B2 | 2/2021 | Karlsson |
| 10,979,744 B2 | 4/2021 | Mcauley et al. |
| 10,987,579 B1 | 4/2021 | Borovikov et al. |
| 11,213,745 B1 | 1/2022 | Burke |
| 11,369,873 B2 | 6/2022 | Smullen et al. |
| 11,565,178 B2 | 1/2023 | Burke |
| 2006/0105841 A1 | 5/2006 | Rom et al. |
| 2006/0159166 A1 | 7/2006 | Mohsenian |
| 2007/0030276 A1 | 2/2007 | MacInnis et al. |
| 2007/0143664 A1 | 6/2007 | Fang et al. |
| 2008/0303835 A1 | 12/2008 | Swift et al. |
| 2008/0303837 A1 | 12/2008 | Swift et al. |
| 2009/0002379 A1 | 1/2009 | Baeza et al. |
| 2009/0027383 A1 | 1/2009 | Bakalash et al. |
| 2009/0119736 A1 | 5/2009 | Perlman et al. |
| 2009/0135190 A1 | 5/2009 | Bakalash et al. |
| 2009/0275414 A1 | 11/2009 | Lee et al. |
| 2009/0318219 A1 | 12/2009 | Koustas et al. |
| 2010/0063992 A1 | 3/2010 | Ma et al. |
| 2010/0134494 A1 | 6/2010 | Lim et al. |
| 2010/0166056 A1 | 7/2010 | Perlman et al. |
| 2010/0166064 A1 | 7/2010 | Perlman et al. |
| 2010/0255909 A1 | 10/2010 | McNamara |
| 2011/0126190 A1 | 5/2011 | Urbach |
| 2012/0004040 A1 | 1/2012 | Pereira et al. |
| 2012/0004042 A1 | 1/2012 | Perry et al. |
| 2012/0084789 A1 | 4/2012 | Iorio |
| 2013/0024545 A1 | 1/2013 | Sheppard |
| 2013/0123019 A1 | 5/2013 | Sullivan et al. |
| 2013/0203496 A1 | 8/2013 | Kruglick |
| 2013/0337916 A1 | 12/2013 | Saretto et al. |
| 2014/0184602 A1 | 7/2014 | Tuffreau et al. |
| 2014/0274368 A1 | 9/2014 | Cotter |
| 2014/0286438 A1 | 9/2014 | Apte |
| 2015/0062132 A1 | 3/2015 | Chann et al. |
| 2015/0133216 A1 | 5/2015 | Heinz, II |
| 2015/0221122 A1 | 8/2015 | Son et al. |
| 2016/0171765 A1 | 6/2016 | Mehr |
| 2016/0296840 A1 * | 10/2016 | Kaewell .................. H04L 65/762 |
| 2016/0332081 A1 | 11/2016 | Marr et al. |
| 2017/0113135 A1 | 4/2017 | Marr et al. |
| 2018/0284871 A1 | 10/2018 | Surti et al. |
| 2018/0296912 A1 | 10/2018 | Hicks et al. |
| 2019/0088015 A1 | 3/2019 | Makinen et al. |
| 2019/0141374 A1 | 5/2019 | McAuley et al. |
| 2020/0027269 A1 | 1/2020 | Jiang et al. |
| 2020/0197821 A1 | 6/2020 | Benedetto |
| 2020/0230499 A1 | 7/2020 | Buser et al. |
| 2020/0368616 A1 | 11/2020 | Delamont |
| 2021/0248012 A1 | 8/2021 | Hejl, Jr. et al. |
| 2021/0316212 A1 | 10/2021 | Borovikov et al. |
| 2022/0193541 A1 | 6/2022 | Burke |

* cited by examiner

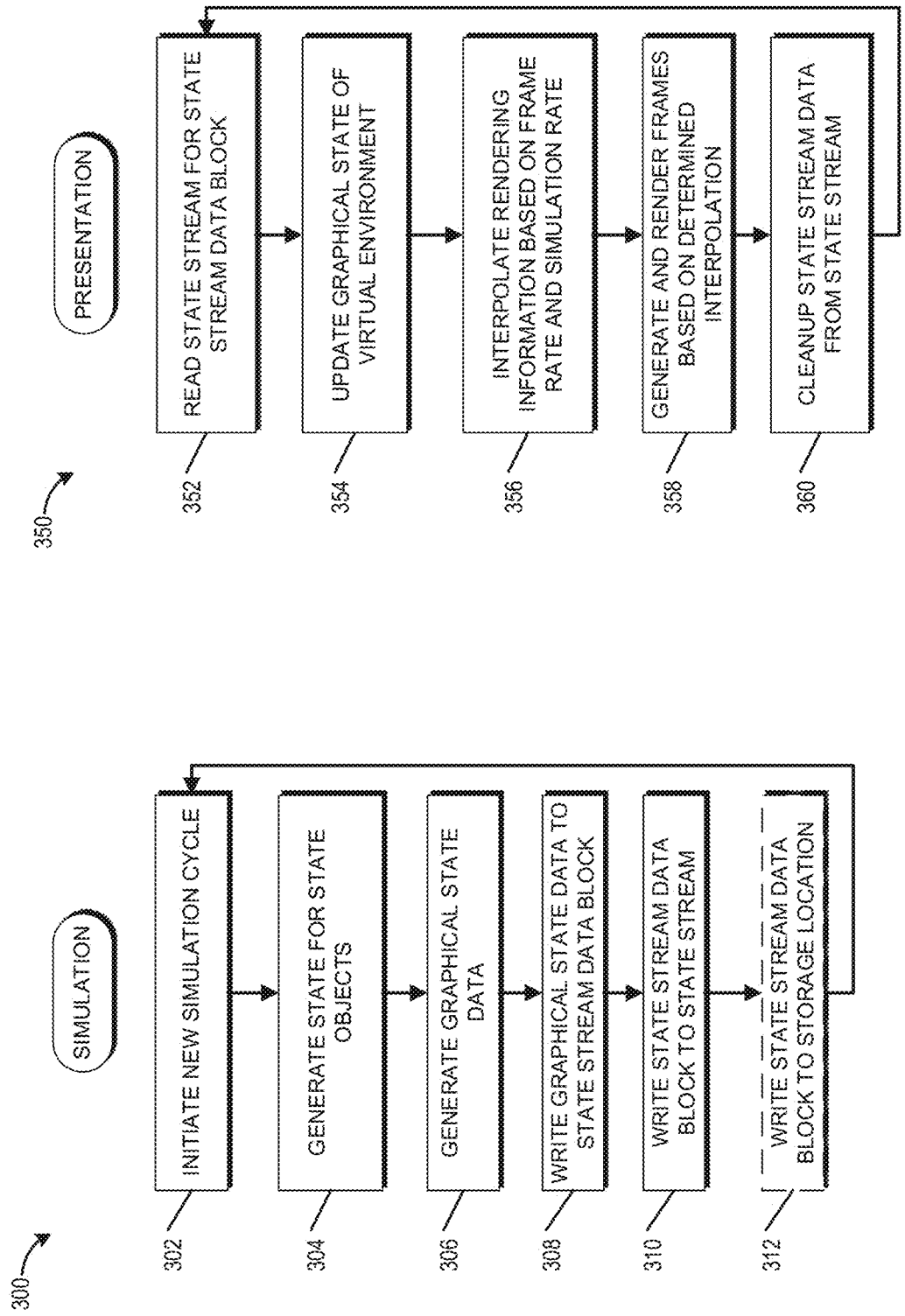

DYNAMIC STREAMING VIDEO GAME CLIENT

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

The availability and feasibility of video games streaming technology has increased in recent years. However, it is still difficult and computationally expensive to try to stream video games to clients. This process only becomes more difficult as video games continue to get larger and more complex. The processing resources required to execute these games can be significant. It is also difficult to meet the bandwidth requirements to stream video games over a low latency connection. Additionally, due to the large size of games, it can take a significant amount of time of a user to begin playing a game after it has been purchased.

SUMMARY OF EMBODIMENTS

The systems, methods, and devices of this disclosure each have several innovative aspects, no single one of which is solely responsible for the all of the desirable attributes disclosed herein.

One embodiment discloses a computer-implemented method for dynamically streaming a game application to a user computing system: by a server computing system comprising at least one hardware processor configured with computer executable instructions, receiving a request to initiate a streaming session of a game application, wherein the request is received from a thin client on a user computing system that does not have the game application locally installed; instantiating a first client instance of the game application, wherein the game application includes a first simulation engine configured to execute game logic that is configured to control simulation of a virtual environment within the game application, and a first presentation engine configured to render frames for streaming to the user computing system based on state data generated by the first simulation engine; determining hardware computing resources of user computing system; initiating a first phase streaming of the game application to the user computing system; during first phase streaming of the game application, receiving user inputs from the user computing system; generating, by the first simulation engine, state data in response to the user inputs; rendering frames of the game application as a video based at least in part on the state data; streaming the video to the user computing device for display within a video player on the user computing system, based on a determination that the hardware resources of the user computing system satisfy the requirements of second phase streaming, transferring assets to the user computing system to execute a second presentation engine on the user computing system; based on a determination that the second presentation engine is executing on the user computing system, transfer execution of the first presentation engine to the second presentation engine within the game application; stopping execution of the first presentation engine. during the second phase streaming of the game application, receiving user inputs from the user computing system; generating, by the first simulation engine, second phase state data in response to the user inputs; transferring the second phase state data generated by the first simulation engine to the user computing system for use by the second presentation engine, wherein the second presentation engine is configured to render frames for the display of the execution of the game application based at least in part on the second phase state data generated by the first simulation engine.

Various embodiments of the system may include one, all, or any combination of the following features. In some embodiments, the method includes, based on a determination that the hardware resources of the user computing system satisfy the requirements of third phase streaming, transferring assets to the user computing system to execute a second simulation engine on the user computing system. In some embodiments, the method includes, based on a determination that the second simulation engine is executing on the user computing system, transferring execution of the first simulation engine to the second simulation engine within the game application. In some embodiments, the method includes stopping execution of the first simulation engine and transferring a full control of the game application to the user computing system. In some embodiments, during the third phase streaming of the game application, the second simulation engine is configured to execute using hardware resources of the user computing system, and the second presentation engine is configured to render frames using hardware resources of the user computing system based on state data generated by the second simulation engine. In some embodiments, writing the second phase state data to a network state stream queue and encoding the second phase state data for transfer over the network to a state stream on the user computing system. In some embodiments, the simulation engine on the client instances executes independent of the presentation engine in the user computing system, wherein the presentation engine generates and renders frames independent of the simulation engine that generated the second phase state data. In some embodiments, the thin client is a web browser. In some embodiments, during the second phase, the presentation engine is configured to render portions of a virtual environment of the game application without requesting additional phase state data from the simulation engine. In some embodiments, the user computing system is a virtual reality system.

Another embodiment discloses a server computing system for dynamically streaming a game application to a user computing system: by a one or more hardware processors configured with computer executable instructions that configure the server computing system to: receive a request to initiate a streaming session of a game application, wherein the request is received from a thin client on a user computing system that does not have the game application locally installed; instantiate a first client instance of the game application, wherein the game application includes a first simulation engine configured to execute game logic that is configured to control simulation of a virtual environment within the game application, and a first presentation engine configured to render frames for streaming to the user computing system based on state data generated by the first simulation engine determine hardware computing resources of user computing system; initiate a first phase streaming of the game application to the user computing system; during first phase streaming of the game application, receive user inputs from the user computing system; generate, by the first simulation engine, state data in response to the user inputs; render frames of the game application as a video based at least in part on the state data; stream the video to the user computing device for display within a video player on the user computing system, based on a determination that the hardware resources of the user computing system satisfy the requirements of second phase streaming, transfer assets to the user computing system to execute a second presentation engine on the user computing system; based on a determination that the second presentation engine is executing on the user computing system, transfer execution of the first presentation engine to the second presentation engine within the game application; stopping execution of the first presentation engine; during the second phase streaming of the game application, receive user inputs from the user computing system; generate, by the first simulation engine, second phase state data in response to the user inputs; transfer the second phase state data generated by the first simulation engine to the user computing system for use by the second presentation engine, wherein the second presentation engine is configured to render frames for the display of the execution of the game application based at least in part on the second phase state data generated by the first simulation engine.

Various embodiments of the system may include one, all, or any combination of the following features. In some embodiments, the one or more processors are configured with computer-executable instructions that further configure the server computing system to, based on a determination that the hardware resources of the user computing system satisfy the requirements of third phase streaming, transfer assets to the user computing system to execute a second simulation engine on the user computing system. In some embodiments, the one or more processors are configured with computer-executable instructions that further configure the server computing system to, based on a determination that the second simulation engine is executing on the user computing system, transfer execution of the first simulation engine to the second simulation engine within the game application. In some embodiments, the one or more processors are configured with computer-executable instructions that further configure the server computing system to stop execution of the first simulation engine and transfer a full control of the game application to the user computing system. In some embodiments, the one or more processors are configured with computer-executable instructions that further configure the server computing system to, wherein during the third phase streaming of the game application, the second simulation engine is configured to execute using hardware resources of the user computing system, and the second presentation engine is configured to render frames using hardware resources of the user computing system based on state data generated by the second simulation engine. In some embodiments, the one or more processors are configured with computer-executable instructions that further configure the server computing system to write the second phase state data to a network state stream queue and encoding the second phase state data for transfer over the network to a state stream on the user computing system. In some embodiments, the simulation engine on the client instances executes independent of the presentation engine in the user computing system, wherein the presentation engine generates and renders frames independent of the simulation engine that generated the second phase state data. In some embodiments, the thin client is a web browser. In some embodiments, during the second phase, the presentation engine is configured to render portions of a virtual environment of the game application without requesting additional phase state data from the simulation engine. In some embodiments, the user computing system is a virtual reality system.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 3A-3B illustrate an embodiment of a flowchart of a process for executing a game application using a state stream game engine.

DETAILED DESCRIPTION OF EMBODIMENTS

Overview

One of the difficulties of streaming video games is that execution of video games on remote servers can be an expensive and computationally intensive process. A streaming system requires remote servers to perform all the processing of both the simulation and presentation of the video game, which is then provided over a network connection as a video stream to the client computing device.

Another problem that players encounter is downloading and installing video games on their computing systems. Due to the size of the video games, the installation process can be quite time consuming. The size of games, in some instances can be over 100 GBs of data to download over a network, which may take many hours to complete. This download process can be quite frustrating if a user is interested in playing a new game with friends or has a limited amount of time to play the game.

Embodiments of the present application provide solutions to these problems by using a phased streaming process with a dynamic video game client. The dynamic video game client can utilize a state stream game engine in combination with a game application streaming service to provide users with the ability to begin playing games quickly on a huge range of devices. The state stream game engine can decouple the simulation of a video game from the rendering of the video game. The simulation of the video game is handled by a simulation engine. The rendering of the video game is handled by a presentation engine. The data generated by the simulation engine is communicated to the presentation engine by using a state stream. The dynamic streaming process includes different phases to provide the game application 110 to the user quickly.

Overview of Video Game Environment

Figure 1:
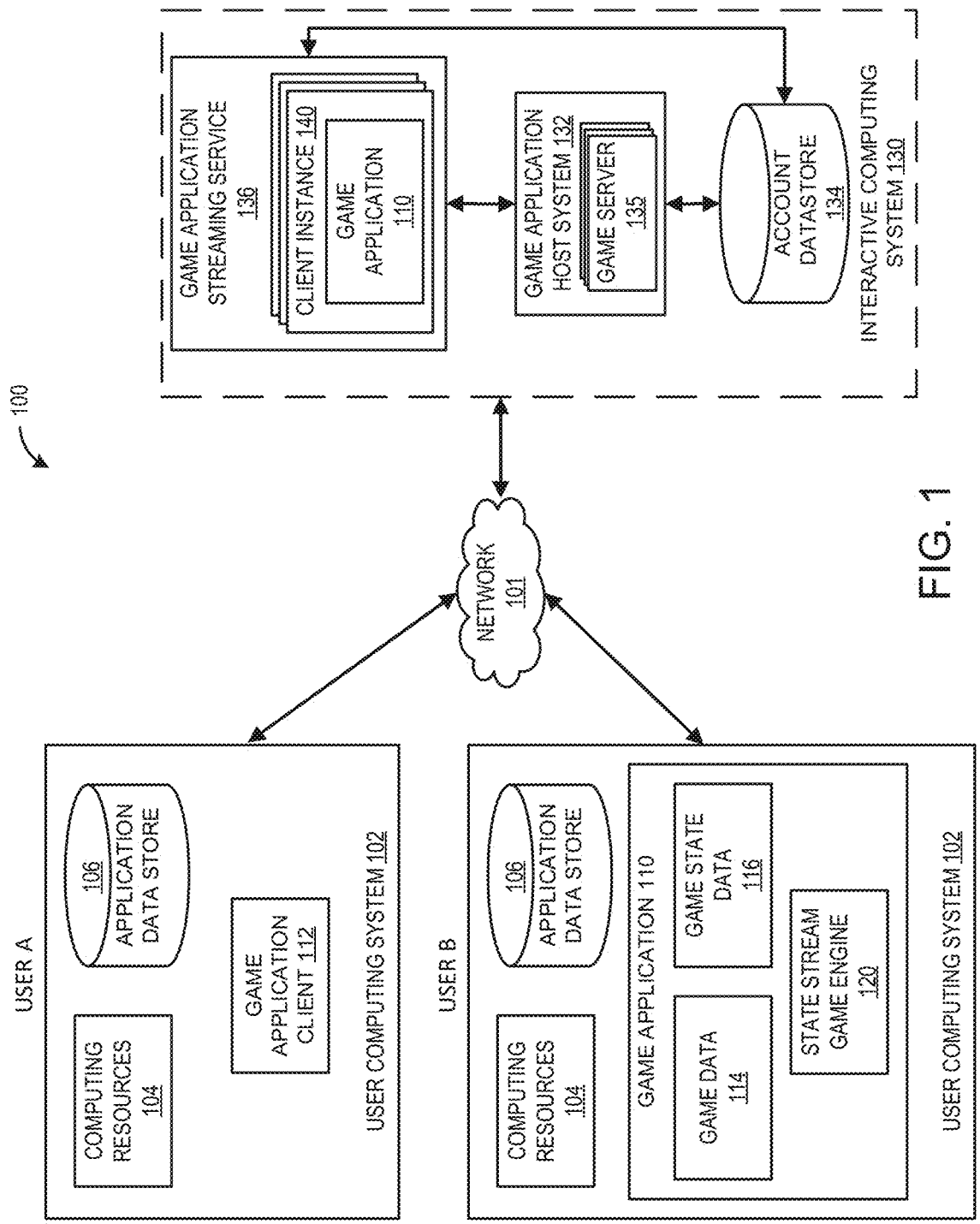
FIG. 1 illustrates an embodiment of a computing environment that can implement one or more embodiments of a dynamic streaming videogame client.

FIG. 1 illustrates an embodiment of a computing environment 100 for implementing a dynamic video game client. The environment 100 includes a network 101, user computing systems 102 associated with User A and User B, and an interactive computing system 130. To simplify discussion and not to limit the present disclosure, FIG. 1 illustrates only exemplary user computing systems 102, and an interactive computing system 140, though multiple systems may be used.

The user computing system 102 may communicate via a network 101 with the interactive computing system 120. Although only one network 101 is illustrated, multiple distinct and/or distributed networks 112 may exist. The network 101 can include any type of communication network. For example, the network 101 can include one or more of a wide area network (WAN), a local area network (LAN), a cellular network, an ad hoc network, a satellite network, a wired network, a wireless network, and so forth. In some embodiments, the network 101 can include the Internet.

A. User Computing Systems

FIG. 1 illustrates exemplary user computing systems 102 that are associated with User A and User B. A user computing system 102 may include hardware and software components for establishing communications over a communication network 101. For example, the user systems 102 may be equipped with networking equipment and network software applications (for example, a web browser) that facilitate communications via one or more networks (for example, the Internet or an intranet). The user computing system 102 may have varied local computing resources such as central processing units (CPU) and architectures, memory, mass storage, graphics processing units (GPU), communication network availability and bandwidth, and so forth. Further, the user computing system 102 may include any type of computing system. For example, the user computing system 102 may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. The specific hardware and software components of the user computing systems 102, are referred to generally as computing resources 104. In some embodiments, the user computing system 102 may include one or more of the embodiments described below with respect to FIG. 5.

The user computing systems 102 that are associated with User A and User B provide examples of different configurations for user computing systems for playing a game application 110. The user A system is illustrated as including the game application client 112 (also referred to as the dynamic game application client or phased application client). The user B system illustrates a traditional installation of a game application 110, where it is installed locally on the user computing system. The configurations of the systems are not meant to be limiting, and the user B system may include the game application client 112, and, as described herein, the user A system may install the game application 110 in phases until it is installed locally on the user's system (as illustrated with respect to user B). The user A computing system may not be configured to execute a game application 110 locally on the system. For example, the user A computing system may not have hardware and/or software computing resources that are capable of executing the game application.

The user computing systems 102 may include virtual reality platforms. Virtual reality platforms may refer to platforms that allow users of a game to interact with a virtual space as the users would interact with the real world. The virtual reality platforms may provide one or more sensory experience that simulates the users' presence in the virtual space. Sensory experience provided by virtual reality platforms may include one or more of experience based on sight, touch, hearing, smell and/or other sensory experience. As non-limiting examples, the virtual reality platforms may include one or more of a virtual reality headset display, a motion controller, a haptic generator, and/or other virtual reality platforms.

In some implementations, the virtual reality platforms may include one or more of non-virtual reality platforms. For example, a virtual reality platform may include a virtual reality headset display and a laptop device. As another example, a virtual reality platform may include a mobile device configured to act as a head-mounted display device. Other combinations and configurations of non-virtual reality platforms to function as virtual reality platforms are contemplated.

Virtual reality platforms may present views of the online game in a manner that simulates the users' immersion within the online game. The online game may have a higher interactive potential when played via the virtual reality platforms than when played via the non-virtual reality platforms. For example, the virtual reality platforms may be able to support additional and/or increased motion inputs, views, visibility, feedback and/or other interactions a user may have with the online game.

1. Game Application

The user computing system 102 can execute a game application 110 based on software code stored at least in part in the application data store 106. The game application 110 may also be referred to as a video game, a game, game code and/or a game program. A game application 110 should be understood to include software code that a computing device 102 can use to provide a game for a user to play. A game application 110 may comprise software code that informs a computing device 102 of processor instructions to execute, but may also include data used in the playing of the game, such as data relating to game simulation, rendering, animation, and other game data.

In the illustrated embodiment, the user computing system 102 is capable of executing machine readable instructions that are configured to execute the game application 110 stored on a data store on the user computing system (e.g., application data store 106). The game application 110, when executed, includes a state stream game engine 120, game data 114, and game state information 116. The game application, when executed, is configured to generate a virtual environment for a user to interface with the game application 110.

In some embodiments, the user computing system 102 may be configured to execute a game application 110 stored and/or executed in a distributed environment using a client/server architecture. For example, the user computing system 102 may execute a portion of a game application 110 and the interactive computing system 130, or an application host system 132 of the interactive computing system 130, may execute another portion of the game application 110. For instance, the game application may be a massively multiplayer online role-playing game (MMORPG) that includes a client portion executed by the user computing system 102 and a server portion executed by one or more application host systems 132. The game application 110 can execute on the user computing system 102 or a distributed application that includes a portion that executes on the user computing system 102 and a portion that executes on at least one of the application host systems 122. In some embodiments, the game application 110 may execute entirely on the interactive computing system 130, and the interactive computing system 130 may stream the gameplay of the game application 110 to the user computing system 102 over the network 101.

i. State Stream Game Engine

Figure 2A:
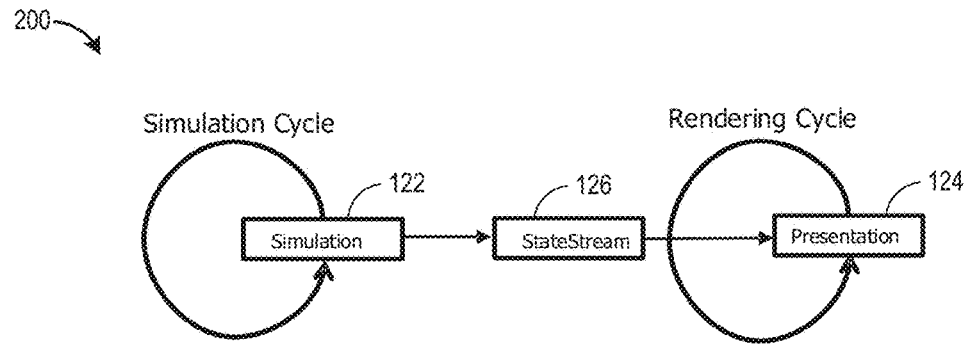
FIGS. 2A-2F provide embodiments of block diagrams illustrating functionality of a state stream video game engine.
Figure 2B:
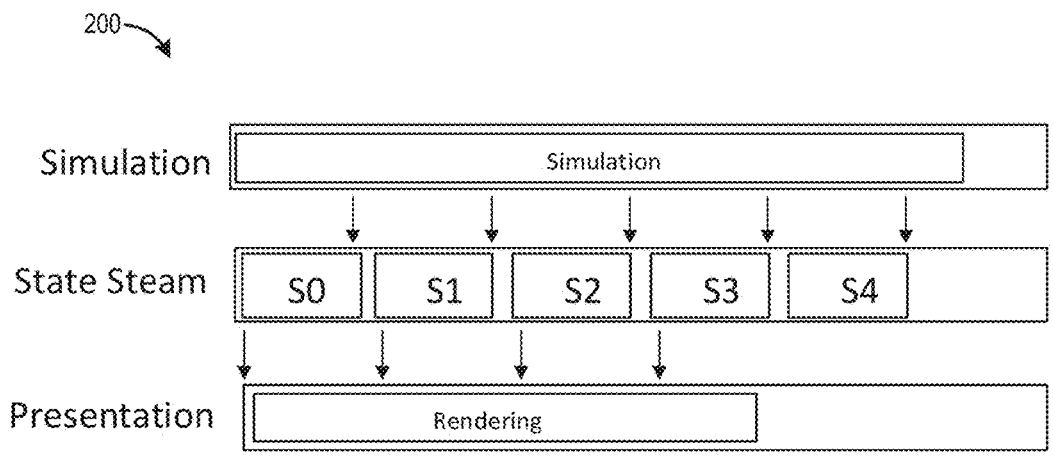

During operation, the state stream game engine 120 executes the game logic, controls execution of the simulation of gameplay, and rendering within the game application 110. The state stream game engine 120 can include a simulation engine 122 and a presentation engine 124 (as illustrated in FIGS. 2A and 2B). The simulation engine 122 can execute the game logic and control execution of gameplay simulation. The presentation engine 124 can control execution of rendering of gameplay frames and the output of the presentation of the frames.

The simulation engine 122 can read in game rules and generates game state based on input received from one or more users. The simulation engine 122 can control execution of individual objects, such as virtual components, virtual effects and/or virtual characters, within the game application. The simulation engine 122 can manage and determine character movement, character states, collision detection, derive desired motions for characters based on collisions. The simulation engine 122 receives user inputs and determines character events, such as actions, collisions, runs, throws, attacks and other events appropriate for the game. The character events can be controlled by character movement rules that determine the appropriate motions the characters should make in response to events. The simulation engine 122 can include a physics engine that can determine new poses for the characters. The physics engine can have as its inputs, the skeleton models of various characters, environmental settings, character states such as current poses (for example, positions of body parts expressed as positions, joint angles or other specifications), and velocities (linear and/or angular) of body parts and motions provided by a character movement module, which can be in the form of a set of force/torque vectors for some or all body parts. From this information, the physics engine generates new poses for the characters using rules of physics and those new poses can be used to update character states. The simulation engine 122 provides for user input to control aspects of the game application according to defined game rules. Examples of game rules include rules for scoring, possible inputs, actions/events, movement in response to inputs, and the like. Other components can control what inputs are accepted and how the game progresses, and other aspects of gameplay.

The simulation engine 122 can output graphical state data that is used by presentation engine 124 to generate and render frames within the game application. Each virtual object can be configured as a state stream process that is handled by the simulation engine 122. Each state stream process can generate graphical state data for the presentation engine 124. For example, the state stream processes can include various virtual objects, such as emitters, lights, models, occluders, terrain, visual environments, and other virtual objects with the game application that affect the state of the game. The execution of the simulation engine 122 is described in further detail herein.

The presentation engine 124 can use the graphical state data to generate and render frames for output to a display within the game application. The presentation engine 124 can combine the virtual objects, such as virtual characters, animate objects, inanimate objects, background objects, lighting, reflection, and the like, in order to generate a full scene and a new frame for display. The presentation engine 124 takes into account the surfaces, colors textures, and other parameters during the rendering process. The presentation engine 124 can combine the virtual objects (e.g., lighting within the virtual environment and virtual character images with inanimate and background objects) to generate and render a frame. The execution of the presentation engine 124 is described in further detail herein.

The state stream game engine is further described with reference to patent application Ser. No. 16/369,514, entitled "State Stream Game Engine," and filed Mar. 29, 2019, which is hereby incorporated by reference in its entirety.

ii. Game Data

The game data 114 can include game rules, prerecorded motion capture poses/paths, environmental settings, environmental objects, constraints, skeleton models, route information, and/or other game application information. At least a portion of the game data 114 can be stored in the application data store 106. In some embodiments, a portion of the game data 114 may be received and/or stored remotely, such as in the data store 134, in such embodiments, game data may be received during runtime of the game application.

iii. Game State Data

During runtime, the game application 110 can store game state data 116, which can include a game state, character states, environment states, scene object storage, route information and/or other information associated with a runtime state of the game application 110. For example, the game state data 116 can identify the state of the game application 110 at a specific point in time, such as a character position, character orientation, character action, game level attributes, and other information contributing to a state of the game application. The game state data 116 can include simulation state data and graphical state data. The simulation state data includes the game state data that is used by the simulation engine 122 to execute the simulation of the game application. The graphical state data includes game state data that is generated based on the simulation state data and is used by the presentation engine 124 to generate and render frames for output, such as to a display of the user computing system 102. The graphical state data can be generated by the state stream processes and included in an SSDP.

2. Dynamic Game Application Client

The dynamic game application client 112 (also referred to as phased game application client, dynamic client, or game application client) can be configured to communicate with the game application streaming service 136 in order to play one or more game applications (such as game application 110) by the user on the user computing system. The game application streaming system 136 executes the game application 110 using the computing resources of the game application streaming service 136 in a client instance 140. The game application client 112 can be configured to communicate with the game application streaming service 136 in order to output the execution of the game application 110 on the user computing system 102. The game application client 112 provides an interface for the user to provide user input to control operation of the game application, as if were being executed locally on the user computing system 102. The game application client 112 can provide an interface to a user to select game application(s) 110 that are available through the game application streaming service 136.

The dynamic game application client 112 can dynamically transition to different phased configurations in order to achieve a client configuration that is suited for the game application 110 and the user computing system 102. The dynamic client 112 transitions between the various phases of operation that adapt to the requirements of the game application 110 and the computing resources of the user computing system 102. For example, the dynamic client 112 can determine the type of user computing system 102 and the computing resources available to the user computing system 102 to determine whether the user computing system 102 is capable of execution the presentation (e.g., rendering of the game application 110) and/or the simulation of the game application 110 using the computing resources of the user computing system 102. The client can dynamically transition from a client that uses a video player-based interface that streams video of the game application 110 from a game application streaming system 136 (where the simulation and presentation are executed on the game application streaming system 136) to a local client (where the simulation and presentation are executed locally on the user computing system 102, such as illustrated by the user B computing system). In some embodiments, the dynamic client 112 can transition dynamically between phases in the background without interrupting the gameplay session of the user. In some embodiments, the transition process can be opaque to the user and be performed automatically without further interaction from the user.

B. Interactive Computing System

The interactive computing system 130 can include one or more application host systems 132 and account data store 134. The interactive computing system 130 may include one or more computing systems configured to execute a portion of the game application 104 and/or host application 106. In some embodiments, the one or more application host systems 122 can include one or more computing devices, such as servers and databases that may host and/or execute a portion of one or more instances of the game application 104 and/or host application 106. In certain embodiments, instead of or in addition to executing a portion of the game application 104 and/or host application 106, the application host systems 122 may execute another application, which may complement and/or interact with the application 104 during execution of an instance of the application 104.

1. Application Host System

The interactive computing system 130 may enable multiple users or computing systems to access a portion of the game application 104 and/or host application 106 executed or hosted by the interactive computing system 130. In some embodiments, the portion of the game application 104 executed in conjunction with application host systems 132 of the interactive computing system 130. The application host system 134 can have one or more game servers 135 that are configured to host online video games. For example, the application host systems may have one or more game servers 135 that are configured to host an instanced (e.g., a first person shooter multiplayer match) or a persistent virtual environment (e.g., a multiplayer online roll playing game). The virtual environment may enable one or more users to interact with the environment and with each other in a synchronous and/or asynchronous manner. In some cases, multiple instances of the persistent virtual environment may be created or hosted by one or more game servers 135. A set of users may be assigned to or may access one instance of the virtual environment while another set of users may be assigned to or may access another instance of the virtual environment. In some embodiments, the host application system 132 may execute a hosting system for executing various aspects of a game environment. For example, in one embodiment, the game application 110 may be a competitive game, such as a first person shooter or sports game, and the host application system 132 can provide a dedicated hosting service (such as, through the game servers 135) for hosting multiplayer game instances or facilitate the creation of game instances hosted by user computing devices. In some embodiments, the host application system 132 can provide a lobby or other environment for users to virtually interact with one another. Such environments may include environments for conducting transactions between players, such as an auction house or type of environment for facilitating transactions.

2. Account Data Store

The interactive computing system 130 can include one or more account data stores 134 that are configured to store user account information associated with game applications hosted by the interactive computing system 130 and/or the application host systems 132.

3. Game Application Streaming Service

The game application streaming service 136 can be configured to communicate with the interactive game application client 112 in order to execute game applications 110 using computing resources local to game application steaming service 136. The game application streaming service 112 can be configured to communicate information to the interactive game application client 136 for the operation and output of a game application 110 being executed by the game streaming service 136. The client (computing system of user A) of the game application streaming service 136 can interactively play the game application on the client's computing system as if it were operating locally. The game application streaming service 112 can receive user input provided by the user computing system 102 through game streaming client 112 to control operation of the game application 110. For example, a game application loaded on the game application streaming service 136 can be output on through the dynamic client 112 and the game application 110 can be controlled based on user inputs received from the user's computing system.

i. Client Instance

The client instance 140 can be instantiated on the game application streaming system 136 and configured to execute the game application 110. The game application 110 is the same as the game application 110 executing on the user computing system 102. The game application streaming service 136 can execute a plurality of client instances 140 in order to execute instances of the game application 110 for each requesting client. The client instance 140 can execute the game application 110 and state stream engine 120, game data 114, and game state data 116. The client instance 140 can communicate with the game application host system 132 in the same manner as the user computing system 102 B. The client instance 140 is a dynamic client instance 140 that can operate in phases. The client instance 140 may be instantiated as a virtual machine instance using the hardware of the game application streaming system 136. The phases and execution of the game application 110 through the client instance 140 are described with further reference to FIGS. 4-5C.

The game streaming service 136 can operate independently of the game application host system 134. The game application streaming system 136 can communicate with the game application host system in the same manner as the user computing system of user B. The client instance 140 can execute the game application 110 as described herein with respect to the user computing system.

As used herein, a virtual environment may comprise a simulated environment (e.g., a virtual space) instanced on a user computing system 102. The virtual environment may be instanced on a server (e.g., an application host system 132 of the interactive computing system 130) that is accessible by a client (e.g., user computing system 102) located remotely from the server, to format a view of the virtual environment for display to a user of the client. The simulated environment may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual environment, and/or surface features of a surface or objects that are "native" to the virtual environment. In some implementations, the topography may describe a surface (e.g., a ground surface) that runs through at least a substantial portion of the virtual environment. In some implementations, the topography may describe a volume with one or more bodies positioned therein (e.g., a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

The game instance of the game application 110 may comprise a simulated virtual environment, for example, a virtual environment that is accessible by users via user computing systems 102 that present the views of the virtual environment to a user. The virtual environment may have a topography, express ongoing real-time interaction by one or more users and/or include one or more objects positioned within the topography that are capable of locomotion within the topography. In some instances, the topography may include a two-dimensional topography. In other instances, the topography may include a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). In some embodiments, the instance executed by the computer components may use synchronous, asynchronous, and/or semi-synchronous architectures.

It should be understood the above description of the manner in which state of the virtual environment associated with the video game is not intended to be limiting. The game application may be configured to express the virtual environment in a more limited, or richer, manner. For example, views determined for the video game representing the game state of the instance of the video game may be selected from a limited set of graphics depicting an occurrence in a given place within the video game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the video game are contemplated.

The game application 110 generates game state data 116 that may be used locally within the game application and may be transmitted to the interactive computing system 130 over network 108. The execution of the instance of the game application 110 may include determining a game state associated with the game application. The game state information may facilitate presentation of views of the video game to the users on the user computing systems 102. The game state information may include information defining the virtual environment in which the video game is played.

The execution of the game instance may enable interaction by the users with the game application and/or other users through the interactive computing system 130. The game application may be configured to perform operations in the game instance in response to commands received over network 108 from user computing systems 102. In some embodiments, users may interact with elements in the video game and/or with each other through the video game.

Users may participate in the video game through client game applications implemented on user computing systems 102 associated with the users. Within the game instance of the video game executed by the state stream game engine, the users may participate by controlling one or more of an element in the virtual environment associated with the video game. The user-controlled elements may include avatars, user characters, virtual environment units (e.g., troops), objects (e.g., weapons, horses, vehicle and so on), simulated physical phenomena (e.g., wind, rain, earthquakes, and/or other phenomena), and/or other user-controlled elements.

The user-controlled avatars may represent the users in the virtual environment. The user characters may include heroes, knights, commanders, leaders, generals and/or any other virtual environment entities that may possess strength, skills, abilities, magic powers, knowledge, and/or any other individualized attributes. The virtual environment units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potion, and/or any other virtual items that may be employed by the users for interaction within the video game.

The user controlled element(s) may move through and interact with the virtual environment (e.g., user-virtual environment units in the virtual environment, non-user characters in the virtual environment, other objects in the virtual environment). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual environment.

Controls of virtual elements in the video game may be exercised through commands input by a given user through user computing systems 102. The given user may interact with other users through communications exchanged within the virtual environment. Such communications may include one or more of textual chat, instant messages, private messages, voice communications, and/or other communications. Communications may be received and entered by the users via their respective user computing systems 102. Communications may be routed to and from the appropriate users through server(s) (e.g., through application host system 132).

Execution and/or performance of the user action by state stream game engine 112 may produce changes to the game state, which may reflect progresses and/or results of the user actions. In some examples, state changes caused by the execution of the user actions may be recorded in the application data store 106 and/or data store 134 to facilitate persistency throughout the instance of the video game. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions and/or any other types of interactions within the virtual environment. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual environment locations controlled by or associated with the users; craft or transport virtual items; interact with, compete against or along with non-player entities and/or virtual environment elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual environment. In some examples, the given user may input commands to compete against elements in an environment within the virtual environment—e.g., Player vs. Environment (PvE) activities. In some examples, the given user may input commands to compete against each other within the virtual environment—e.g., Player vs. Player (PvP) activities.

The instance of the game application 110 may comprise virtual entities automatically controlled in the instance of the game application. Such virtual entities may or may not be associated with any user. As such, the automatically controlled virtual entities may be generated and/or developed by artificial intelligence configured with the game application and/or servers (e.g., application host system(s)) by a provider, administrator, moderator, and/or any other entities related to the game application. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server (s) (e.g., application host system 132). As used herein, such automatically controlled virtual environment entities in the instance of the video game are referred to as "non-player entities."

In an online game, the instance of the video game may be persistent. That is, the video game may continue on whether or not individual users are currently logged in and/or participating in the video game. A user that logs out of the video game and then logs back in some time later may find the virtual environment and/or the video game has been changed through the interactions of other users with the video game during the time the user was logged out. These changes may include changes to the simulated physical space, changes in the user's inventory, changes in other users' inventories, changes experienced by non-user characters, and/or other changes.

Embodiments of State Stream Game Engine

FIGS. 2A-2F illustrates an embodiment of the functionality of the state stream game engine 120 in additional detail. In the illustrated embodiment, the state stream game engine 120 comprises the simulation engine 122, the presentation engine 124, and the state stream 126, which are configured to control the execution and the output of rendered frames for display. Generally, the simulation engine 122 is configured to execute the game logic of the game application and control the state of operation. The simulation engine 122 interfaces with the different state generating objects of the game application 110 and provides the simulation and control of the game application 110 based on the various game rules and constraints, and inputs received from users. The simulation engine 122 responds to inputs provided by the user and determines how the game application 110 responds to external inputs as well as internal inputs within the virtual environment. The simulation engine 122 determines how each virtual object acts and reacts within the game application. Generally, the CPU of the computing device executes the functions and processes handled by the simulation engine 122, though execution of the simulation engine 122 is not limited to the CPU. The presentation engine 124 is configured to control the output the presentation of the game application 110 by generating and rendering frames for display on the user computing system 102 or another device. Generally, a GPU of the computing device executes many of the functions and processes handled by the presentation engine 124, though execution of the presentation engine 124 is not limited to the GPU.

FIG. 2A illustrates an example of an embodiment 200 of execution of the state stream game engine 120. The state stream game engine provides a system architecture that provides for the execution of the simulation engine 122 to be decoupled from the execution of the presentation engine 124. The simulation engine 122 generates an SSDP and publishes the SSDP to a state stream 126, which may be managed by a state stream manager. The presentation engine 124 reads SSDPs from the state stream 126 to generate rendered content (e.g., frames) to output. Generally, the simulation engine 122 does not communicate directly with the presentation engine 124. Rather, the simulation engine 122 generates an SSDP and writes the SSDP to the state stream 126. The SSDP is generated and finalized by simulation engine 122 before it is available to the presentation engine 124 on the state stream 126. After finalization of the SSDP, the simulation engine 122 can begin generation of the next SSDP. The presentation engine 124 can access the SSDP only after the SSDP is written to the state stream. The presentation engine 124 uses the SSDP to render frames within the game application 110. The presentation engine 124 can use any of the SSDPs generated by the simulation engine 122 in order to generate and render frames. The execution of the presentation engine 124 can execute at least one cycle behind the execution of the simulation engine 122 because the simulation engine 122 must finalize the SSDP before the presentation engine 124 can begin rendering using the graphical state data included within the SSDP. Some example embodiments of execution of the simulation engine 122 and presentation engine 124 are further illustrated in FIGS. 2D-2F.

The state stream 126 can be a location in volatile cache memory of the user computing device 102. The state stream 126 may be a ring buffer of a defined size within the cache that will continually overwrite SSDPs after a defined period of time. In some embodiments, as will be described in more detail herein, the game application 110 may have multiple simulation engines 122 122 operating concurrently, and the presentation engine 124 can render frames based on the plurality of SSDP's generated by the plurality of simulation engines 122 122. In such embodiments, each simulation engine 122 can be associated with a different state stream such that each simulation engine 122 is assigned a different logical location in the cache memory for writing SSDPs. In some embodiments, all the simulation engines 122 may write to a common state stream.

The simulation engine 122 generates an SSDP during a simulation cycle, the simulation cycle executes at a rate that is independent of a rate of a rendering cycle, during which the presentation engine 124 outputs a rendered frame of the game application. In the illustrated embodiment, the simulation engine 122 has a simulation cycle of 30 Hz. During each simulation cycle, the simulation engine 122 generates and writes an SSDP to the state stream. The presentation engine 124 reads the SSDPs from the state stream 126. The rate at which the presentation engine 124 renders frames can be greater than the rate at which the simulation engine 122 generates SSDPs. The presentation engine 124 can interpolate the SSDPs in order to render frames at a faster rate than the rate at which the SSDPs are generated by the simulation engine 122. Some examples of rendering and interpolation are illustrated in FIGS. 2D-2F. Although in the illustrated example, the simulation engine 122 is running at a fixed rate and the presentation engine 124 is running at a variable rate, the simulation engine 122 and/or the presentation engine 124 can execute at a fixed or variable rate. The SSDP's can be generated at any frequency as defined by the game application and/or the hardware computing resources of the interactive computing system servers and/or the client computing devices. For example, the SSDP's could be generated at 10, 15, 30, 40, 60, 120 Hz, or any other time period. In some embodiments, the simulation cycle may have a variable rate.

Figure 2C:
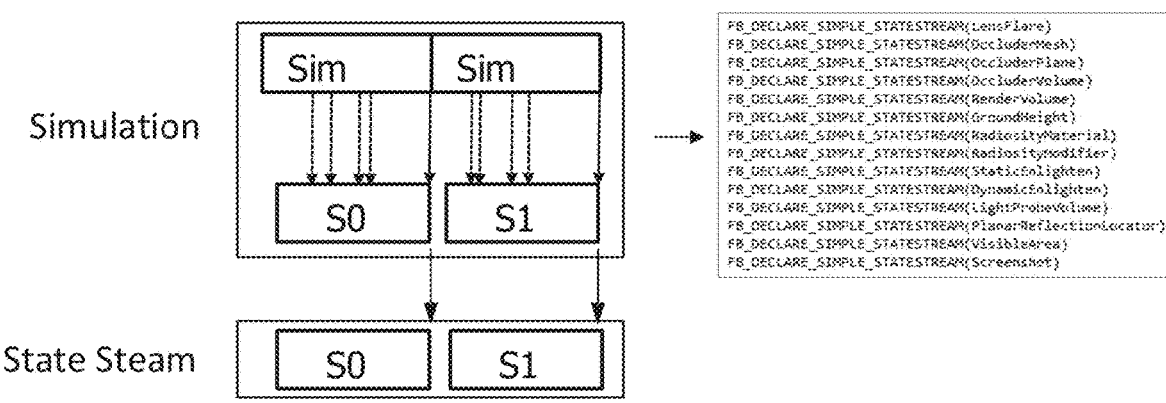
Figure 2D:
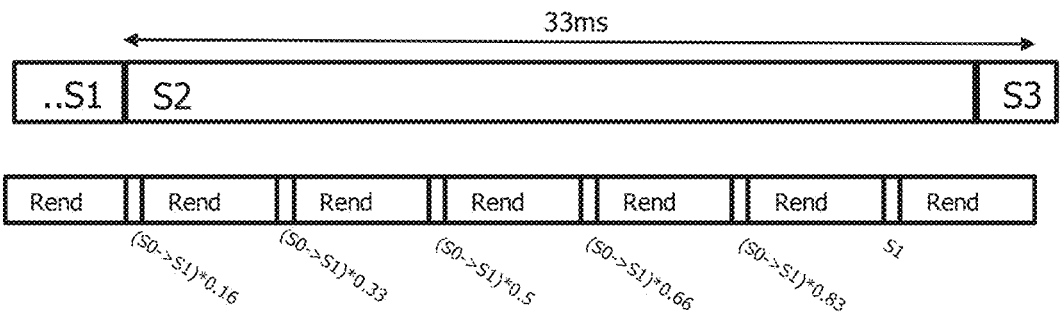
Figure 2E:
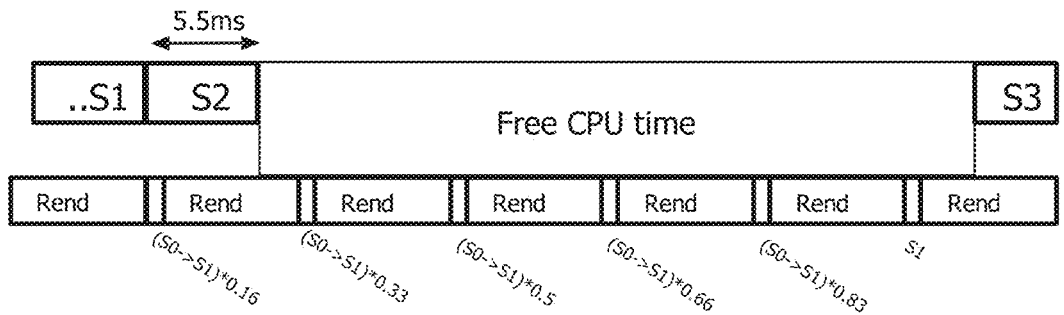
Figure 2F:
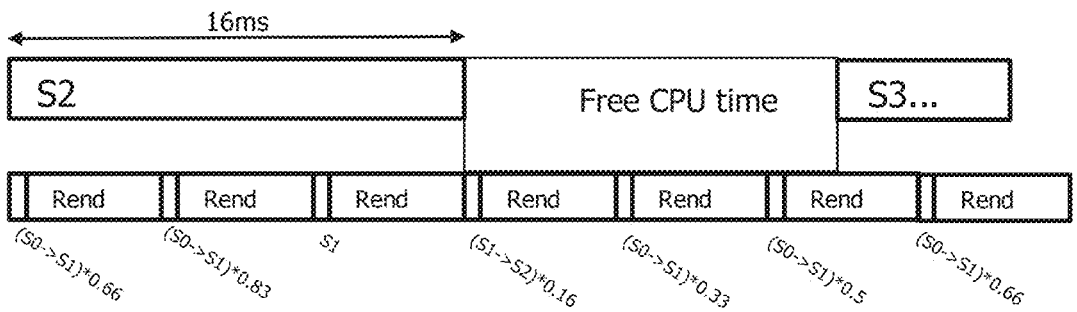
Figure 2G:
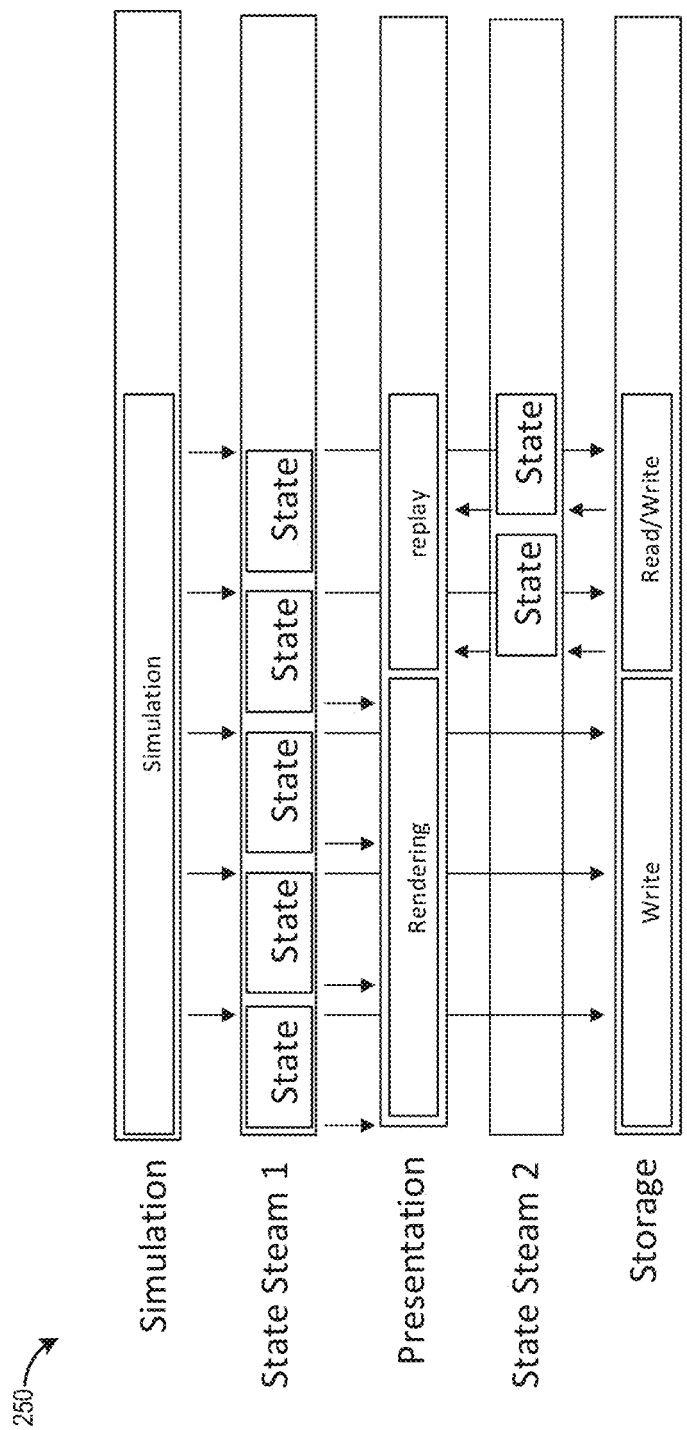
FIG. 2G illustrates an embodiment of a block diagram of a state stream game engine configured to implement replay functionality.

With additional reference to FIGS. 2B and 2C, the embodiment 200 of the state stream game engine 120 is illustrated with additional detail. As illustrated, the simulation engine 122 can generates discrete SSDPs during runtime of the game application, which are illustrated by blocks S0, S1, S2, and so on. The SSDPs are written to the state stream 126 by the simulation engine 122. In some embodiments, the SSDP may be written as a complete block to the state stream 126 or may be written piecemeal to the state stream. In either case, The SSDP is not available to the presentation engine 124 on the state stream until the SSDP is complete and made available to the presentation engine 124. After an SSDP is available, the presentation engine 124 then reads the SSDP from the state stream 126. Generally, communication of the simulation engine 122 and the presentation engine 124 with the state stream is a one-directional. The simulation engine 122 writes to the state stream and the presentation engine 124 reads from the state stream. The simulation engine 122 and presentation engine 124 can operate in different threads. In this manner, the simulation engine 122 can run independent of each other. As long as the presentation engine 124 lags behind the generation of SSDP by the simulation engine 122, then the presentation engine 124 can continue to render without waiting for the generation of the next SSDP. Additionally, since each SSDP contains all the state necessary for rendering, the presentation engine 124 does not have to wait for the computation and generation of state values for individual state stream processes within the SSDP. As illustrated in FIG. 2C, each SSDP is composed of a plurality of individual state stream processes that are generated during each simulation cycle. The generation of the state stream processes are added to the SSDP, and after all the state stream processes have been completed, the SSDP will be finalized and available on the state stream. In some embodiments, the SSDP will be written at a defined rate, such as at 30 Hz. As illustrated, when the cycle is completed and the SSDP is finalized (e.g., S0), the simulation engine 122 can begin generation of the next SSDP (e.g., S1).

The state stream processes comprise the state generating objects within the game application that need to be provided to the presentation engine 124 in order for the presentation engine 124 to have the state information necessary to generate the render state of the game at the point in time that the SSDP is generated. FIG. 2C provides an abbreviated list of example state stream processes that may be included in an SSDP, such as, LensFlare, OccluderMesh, OccluderPlane, OccluderVolume, RenderVolume, GroundHeight, and so forth. Generally, all game systems within a game application can go through state stream. For example, some games systems executed within the game application can include Models, Emitters, Lights, Visual environments, and others. The graphical state data generated for state stream processes can differ from the simulation state data in that, the graphical state data includes a subset of the state necessary for the presentation engine 124 to regenerate the graphical virtual environment at the time that graphical state data was generated. The graphical state data can be a filtered version of the simulation state data associated with the virtual objects that include less than all of the state that is required to execute the game. For each state stream process of a virtual object, the graphical state data can include static state information and dynamic state information. Static state information refers to state information that is the same for the entire life of an object. Dynamic state information refers to state information that changes over the life of an object. The full graphical state of an object at time X (that is, the time at which the SSDP is generated) is the static state information in conjunction with the interpolated dynamic state information.

As discussed, the state data provided by the simulation engine 122 to the state stream 126 is a subset of the simulation state data associated with a virtual object. The graphical state data included in a state stream process provides the state data necessary for the presentation engine 124 to generate the graphical state of the game at particular point in time. The graphical state data can provide static and dynamic state information such as locations, transforms, and any necessary information for the presentation engine 124 to recreate the virtual environment at a particular point in time. The state of the virtual environment is frozen in time when the state stream processes are generated for an SSDP. The presentation engine 124 is capable of using the state information provided within an SSDP to recreate at least a portion of the virtual environment of the game application at the point in time, similar to a freeze frame or screenshot of the virtual environment. In some embodiments, the SSDP may provide a default point of view for generating and rendering the frame (e.g., the player's perspective within the game application). However, the SSDP provides sufficient graphical state data for the recreation of the graphical state of the virtual environment at the point in time of the SSDP and the generation of the graphical state at the time is not limited to a single perspective within the game application (e.g., the player's perspective). The SSDP can provide the state data required to recreate the virtual environment from any angle or camera perspective. This allows the presentation engine 124 to generate and render a frame of the graphical state from any angle or position within the virtual environment, or portion thereof, based on the graphical state data. For example, an action within the game may trigger the creation of frames from a different perspective than the player's default point of view.

As an illustrative example of graphical state data, a wheel on a moving car within an instance of the virtual environment may include static state data used for identifying unchanging characteristics (such as, the mesh and skin of the wheel), and the dynamic state data identifying changing characteristics of the wheel (such as, location of the wheel within the virtual environment and rotation of the wheel about a center axis). The graphical state data of the wheel does not need to include data that is relevant to the simulation of the game, such as the speed of the rotation of the wheel or the speed at which the car is travelling within the virtual environment, but is not relevant or does not affect the rendering of the wheel within the game application. In this example, the 'frozen' state of the wheel would be provided as graphical state data for the wheel state stream process within the SSDP and then written to the state stream. The presentation engine 124 can then use the graphical state data provided within the SSDP to render a frame. The generated frame may or may not include a rendering of the wheel. However, the graphical state data for the wheel would be included within the SSDP in order for the presentation engine 124 to generate the game environment and render a frame from a perspective that would include the wheel in the correct position.

In some embodiments, the graphical state data that is generated for each state stream process can be stored as a difference between the current SSDP and the previous SSDP. The state values of each of the various state variables within the game can be stored as a struct that maintains the state values for an object. In this manner, the simulation engine 122 can determine what the state of an object at any point during the simulation.

In some embodiments, the presentation engine 124 can maintain a copy of the current graphical state data generated by the simulation engine 122. The simulation engine 122 may be configured to only write state values that have changed from the previous state to the SSDP. The presentation engine 124 can use the graphical state data received from the SSDP to update the current graphical state of the virtual environment. In this manner, the size of SSDP can be significantly reduced as compared to generating an entire copy of the graphical state data for the current graphical state of the virtual environment. This can also reduce the amount of time that is required for the simulation engine to generate and finalize an SSDP.

With additional reference to FIGS. 2D-2F, various embodiments of the timing and synchronization of the simulation engine 122 and presentation engine 124 are illustrated. The independence of the execution of the simulation engine 122 and presentation engine 124 provide for a plurality of the different modes of operation of the state stream game engine. FIGS. 2D-2F provide examples of instances of execution of the simulation and rendering cycles. The examples are not limiting and merely provides illustrative examples for executing the state stream game engine. The presentation engine 124 can render frames by interpolation between the previous two SSDPs generated by the simulation engine 122 (e.g., S0 and S1). The illustrated examples provide examples of how the simulation engine 122 and presentation engine 124 execute during a simulation cycle. In the illustrated examples, the presentation engine 124 is executing rendering cycles at 180 Hz and the simulation engine 122 is executing simulation cycles at 30 Hz, which results in six rendering cycles for each simulation cycle.

The presentation engine 124 can render a plurality of frames based on each SSDP. The presentation engine 124 can run at a faster cycle time than the simulation engine 122. For example, the simulation engine 122 may be operating at 30 Hz and the presentation engine 124 is rendering frames at a greater rate (e.g., 180 Hz). The presentation engine 124 will need to generate multiple frames to output to the display between each generation of a SSDP. For example, if the simulation engine 122 generates an SSDP at each simulation cycle at 30 Hz and the presentation engine 124 renders frames at 120 FPS, then the presentation engine 124 would need to generate 4 frames per simulation cycle, or in other words execute four rendering cycles per simulation cycle. The presentation engine 124 can use a previous SSDP (e.g., S0) and the current state (S1) in order to determine interpolation of the graphical states of the virtual environment. In some embodiments, the presentation engine can lag behind the simulation current cycle by more than one cycle. For example, the presentation can use S0 and S1 for generation of frames even though the current cycle is S4.

The presentation engine 124 does not write or change the values of the states of the graphical state data that is written to the state stream by the simulation engine 122. The presentation engine 124 can perform functions of cleaning up SSDPs after they have been consumed by the presentation engine 124 and are no longer needed. Once the presentation engine 124 has fully consumed a state, or if a state was never used, the state can be deleted from the state stream, or flagged for deletion or overwriting.

FIG. 2D illustrates an embodiment in which the simulation engine 122 generates and finalizes an SSDP at the end of the simulation cycle, such that S2 is completed just prior to the end of the sixth rendering cycle. If generation of the SSDP takes the entire simulation cycle to complete. After the simulation engine 122 completes the SSDP (S2), simulation engine 122 immediately begins the next SSDP (S3). The presentation engine 124 can continue to render frames without las as long as the SSDP completes prior to the end of the sixth rendering cycle. In this embodiment, there is no buffer between the time that the SSDP is completed and the rendering for the next rendering cycle needs to commence. In which case, if the finalization of the SSDP is delayed, the next rendering cycle can be delayed as well.

FIG. 2E illustrates an embodiment in which the simulation engine 122 generates and finalizes an SSDP prior to the end of the simulation cycle, such as in 5.5 milliseconds of the total 33 milliseconds allocated to the simulation cycle time. Since generation of the SSDP takes only a portion of the simulation cycle to complete, the simulation engine 122 can dedicate processing resources to other processes, such as rendering prior to initiation of the next SSDP (S3). At the beginning of the next simulation cycle, the simulation engine can generate the next SSDP. The length of time the simulation engine takes to generate the SSDP may differ based on the simulation of the game. For example, more dynamic simulation processes where many state values are changing can result in the generation of SSDPs at a slower rate (such as illustrated in FIG. 2D) than compared to when a user is in a menu selection screen within the simulation of the game application 110.

FIG. 2F illustrates an embodiment in which the simulation engine 122 generates and finalizes an SSDP prior to the end of the simulation cycle, such that S2 is completed with a buffer of time prior to the end of the sixth rendering cycle. Generation of the SSDP takes only a portion of the simulation cycle to complete. After the simulation engine 122 completes the SSDP (S2), simulation engine 122 can dedicate processing resources to other processes, such as rendering prior to initiation of the next SSDP (S3). In this embodiment, the simulation engine has a variable simulation cycle and the simulation engine begins generating an SSDP that does not follow a fixed simulation cycle duration. The SSDP can include the time that the simulation cycle took to complete. This information can be used by the presentation to predict the number of rendering cycles between simulation cycles. This can be also be used when the simulation cycle takes longer than the determined simulation cycle time. For example, if the creation of the SSDP took 55 milliseconds, the presentation engine can predict that the more rendering cycles will need to be completed prior to receiving the next SSDP. In such a case, the presentation can adjust the interpolation of the SSDPs and the number of rendering cycles based on the prediction.

State Stream Game Engine with Replay Functionality

FIG. 3 illustrates a block diagram 300 of a state stream game engine that includes replay functionality. In the illustrated embodiment, the replay functionality can be implemented by writing the SSDPs to the state stream and to storage simultaneously. Generally, after the state is consumed by the presentation engine 124, it is removed from the state stream and no longer available to use for rendering by the presentation engine 124. However, the SSDP can be persistently saved by having the simulation engine 122 simultaneously write to a storage location, such as non-volatile memory, on the computing device. The storage location can be written to a different location on the computing device than what is designated and allocated for the state stream. The presentation engine 124 can load the states from the disk to the state stream in order to consume the states again. In the illustrated example, the SSDP is being written from the storage to a second state stream. Though illustrated as a second state stream, the first state stream and the second state stream may be the same allocated memory location on the computing device. In some embodiment, the state stream game engine may have different state streams with different allocated memory locations.

The SSDPs written to memory may be used for replaying the sequences of a gameplay session. For example, if a user wanted to watch a replay of highlights of a game, the SSDPs associated with the requested sequence of events could be written from storage into state stream. The presentation engine 124 could generate and render the frames for the SSDPs in order to display a replay to the user. The data could be displayed in the same manner and angle that was originally provided to the user during gameplay of the game, such as a goal in a soccer game. Additionally, the state data includes the state data necessary for the presentation engine 124 to recreate the virtual scene within the game application, the presentation engine 124 can render the replay from a different perspective or point of view within the game environment. For example, the replay may provide the replay of a goal scored by the player, which can be displayed from the goal scorer's point of view, the goal keeper's point of view, a bird's eye point of view, or any other point of view. The recreation of the scene can be controlled by a display manager of the presentation engine 124. In some embodiments, the simulation engine may generate a display manager SSDP that can be used by the presentation engine to determine the point of view that is being output for display. For example, during gameplay the display manager SSDP can provide instructions for the presentation engine to use the SSDP from state stream A and during a replay, the display manager SSDP can provide instructions for the presentation engine to use the SSDP from state stream B.

The SSDPs written to storage during the gameplay session may be stored in a ring buffer. The ring buffer may cycle through a defined amount of gameplay time, such as 10 minutes, 15 minutes, or another amount of defined time. Some of the SSDPs can be flagged so that they are not overwritten when the ring buffer cycles through. The SSDPs may be flagged based on specific events that occurred during gameplay, such as scoring a goal, or based on other criteria defined by the specific rules and parameters of the game application. Generally, after an SSDP is consumed, the presentation engine 124 manages the removal of the SSDP from the state stream. In the case of SSDPs that are written into the state stream from storage, the SSDP may be rewritten into storage or not removed from storage when written into the state stream prior to consumption by the presentation engine 124.

In some embodiments, the presentation engine 124 can utilize multiple different SSDPs to generate and render a frame. The presentation engine 124 may pull state information from any number of states in order to generate a frame. For example, the presentation engine 124 may generate a series frames by combining multiple states together to create a collage of graphics generated from multiple different states.

State Stream Execution Processes

FIGS. 3A-3B illustrate embodiments of flowcharts for executing processes of a state stream game engine within a game application. The processes, in whole or in part, can be implemented by CPUs and/or GPUs configured with computer readable instructions to execute a game application. For example, the process, in whole or in part, can be implemented by the game application, state stream game engine, simulation engine 122, state stream, and/or the presentation engine 124. Although any number of systems, in whole or in part, can implement the processes, to simplify discussion, the processes will be described with respect to the game application, state stream game engine, simulation engine 122, state stream, and/or the presentation engine 124.

Simulation engine Execution Process

FIG. 3A illustrates an embodiment of a process 300 for execution of a simulation engine 122 during a simulation cycle within the state stream game engine.

At block 302, a simulation engine 122 initiates a new SSDP for a simulation cycle. The new SSDP can be initiated immediately after a previous SSDP (such as, illustrated in FIG. 2D), or there may be a time period between the previous SSDP and the new SSDP (such as, illustrated in FIGS. 2E-2F). The simulation cycle can be configured to occur on a periodic basis (such as, every 30 Hz), an aperiodic basis (such as, as soon as the previous cycle completed), or based on requirements of the game application (such as, after receiving input from other user computing devices in a multiplayer game).

At block 304, the simulation engine 122 generates state data for at least a portion of the virtual objects within the simulation. During the simulation cycle, the simulation engine can generate new state data for virtual objects within the virtual objects. The simulation may only generate state data for virtual objects where the state data changed in the current simulation cycle compared to the previous simulation cycle. In some embodiment, state data for all virtual objects are generated in each simulation cycle. The simulation engine may only generate state data that is associated with a portion of the virtual environment. For example, in an online game, the simulation engine may only have access to a portion of the total state data associated with the virtual environment.

At block 306, the simulation engine 122 generates graphical state data for state stream processes that are necessary for presentation engine 124 to render virtual objects within the virtual environment. The graphical state data can be a subset of the simulation state data. The simulation engine may not generate any data for state stream process where the state did not change when compared to the previous simulation cycle.

At block 308, the simulation engine writes the graphical state data to the SSDP. The graphical state data for state stream process can be written to the SSDP as soon as the graphical state data is generated.

At block 310, the simulation engine 122 finalizes the SSDP and makes the SSDP available to the presentation engine on the state stream. The simulation engine may write the SSDP to the state stream as a single block or may write to the state stream during the simulation cycle and not finalize or otherwise make the SSDP available until the SSDP is complete. The finalized SSDP can be written to the state stream at the time designated by the timing of the simulation cycle. The state stream can be a location in volatile cache memory that is allocated for the simulation engine 122. The write can be one-directional, from the simulation engine 122 to the state stream. In some embodiments, the SSDP can have a defined time period in which to generate and write the SSDP to the state stream. The SSDP may be completed prior to the end of a simulation cycle. For example, a SSDP may be completed halfway through the simulation cycle.

At block 312, optionally, the simulation engine 122 writes the SSDP to an allocated storage location, simultaneously with the SSDP written to the state stream. The allocated storage location may be located in non-volatile storage on a storage device. After the write is complete, the process returns to block 602

Presentation Engine Execution Process

FIG. 3B illustrates an embodiment of a process 350 for execution of a presentation engine 124 within the state stream game engine.

At block 352, the presentation engine 124 reads at least one SSDP from the state stream for a new rendering cycle. The read is one-directional. The presentation engine 124 does not write modify the graphical state data included in the SSDP. The presentation engine 124 does not read data directly from the simulation engine 122.

At block 354, the presentation engine can update the current graphical state of the virtual environment based on the SSDP. The presentation engine can maintain the current graphical state of each virtual environment. Based on the SSDP, the presentation engine can then update the current state based on the state values that were changed and provided by the SSDP.

At block 356, the presentation engine 124 uses the SSDP (SSDP1) and a previous SSDP (SSDP0) to determine interpolation for rendering of frames based at least in part on a rendering frame rate and a simulation cycle time period. When the simulation cycle occurs at a defined periodicity, the presentation engine 124 can determine the interpolation calculations based on the calculated frame rate. The presentation engine can predict the number of rendering cycles based on a predicted or defined simulation rate and the predicted or defined frame rate.

At block 358, the presentation engine 124 renders frames based on determined interpolation. The frames can be rendered using the graphical state data from SSDP1 and SSDP0. In some embodiments, graphical state data can be used from more than one SSDP in order to render one or more frames. In some embodiments, the presentation engine may use SSDPs for rendering that are a plurality of states behind a current state. The presentation engine 124 can generate and render frames using the SSDPs without any interaction or dependencies to the simulation engine 122.

At block 360, after the rendering cycle is complete and the SSDP is no longer needed from the state stream, the presentation engine 124 can clean up or otherwise tend to the disposal of the SSDP. The presentation engine 124 may delete one or more SSDPs from state stream. In some embodiments, the presentation engine 124 may delete SSDPs that were consumed and/or SSDPs that were not consumed, but are no longer needed. In some embodiments, the state stream is a ring buffer, and the presentation engine 124 flags SSDPs within the ring buffer that can be overwritten. After the rendering cycle is complete, the process returns to block 352.

FIGS. 4A-4D—Dynamic Client Execution Phases

Figure 4:
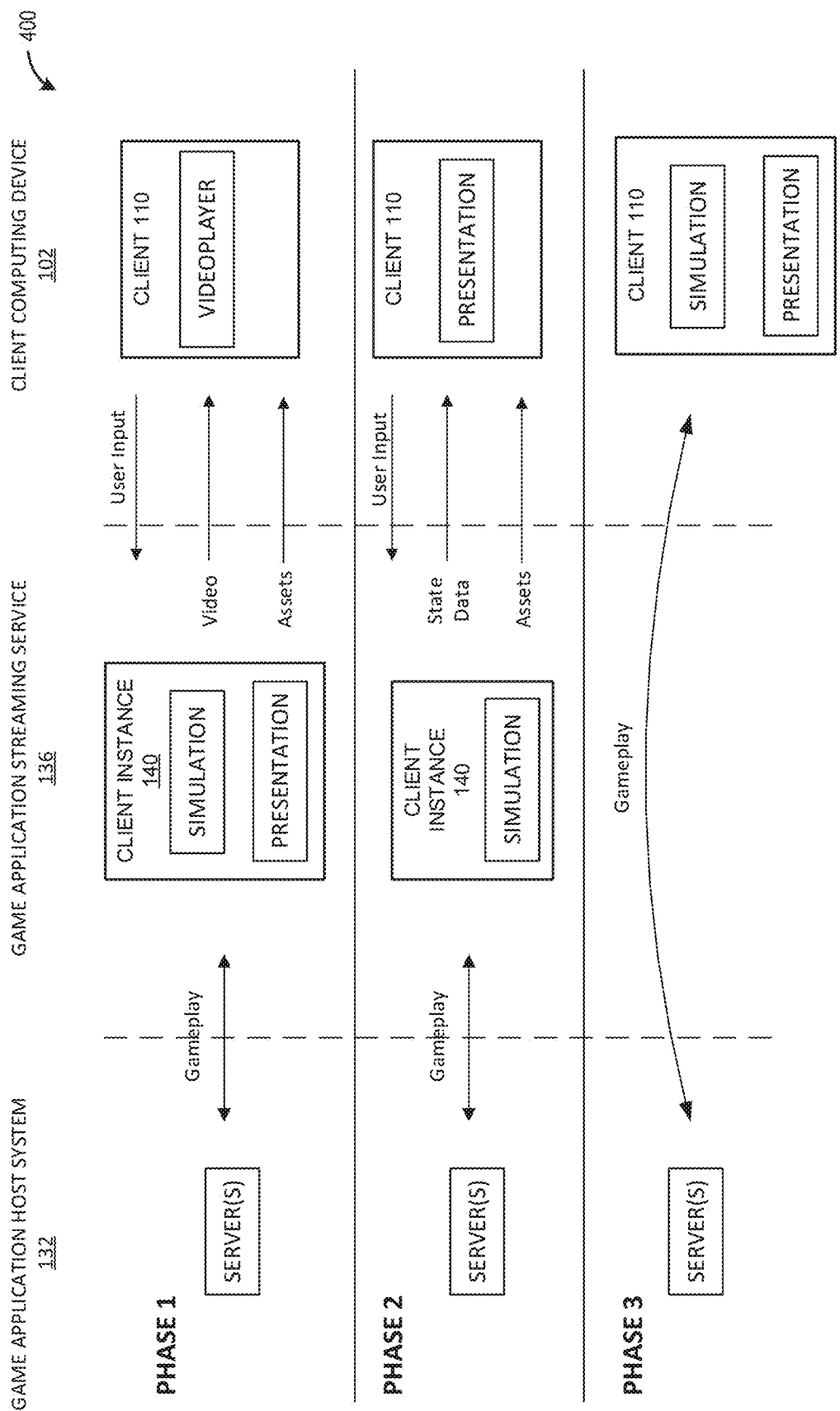
FIG. 4 illustrates an embodiment of a block diagram of an implementation of a dynamic streaming video game client.

FIG. 4 illustrates block diagrams of the phases of execution of the dynamic client 112. The dynamic client 112 is configured as a video-player based client (also referred to as a thin client) on the user computing system 102. The dynamic client 112 can interface with the interactive computing system 130 and can be configured to provide an interface that allows a user to select game application 110s to play that have not been installed locally on the user computing system 102. The user may be logged into a user account that identifies game applications 110 that are available to the player (e.g., previously purchased by the player or available through a subscription). The games may also be games that are available for the player to purchase. For example, the player could purchase a game outright or purchase a license to play a game for a period of time, such as a monthly subscription. The interface may be accessible through a web browser application.

The dynamic client 112 can be configured so that the user can select a game application 110 to play and request to initiate a game session for the game application. The dynamic client 112 can allow the client to install the game in phases so that the user can start playing the game quickly. The phases of play are illustrated in FIG. 4. Prior to initiation of the game application 110, the dynamic client 112 can do an analysis of the computing resources to generate a computing profile on the user computing system 102 to determine the phases that the user computing system 102 can execute. The final phase of execution may be automatically determined by the game application 110. In some embodiments, the dynamic client may allow the user to select the phase that the user computing system 102 will use. Some game application 110s can be configured to only execute in some of the phases. For example, a game may only be configured to execute in phase 1, phase 2, phases 1 and 2, or phases 2 and 3. The execution restraints may be based on hardware or software configurations/limitations, licensing requirements or limitations, manufacturer or publisher or distributor limitations, or other limitations imposed by the interactive computing system 130.

In phase 1, the user requests to play a game application 110 through the dynamic client 112. The dynamic client 112 transmits the request to the game application streaming system 136. Based on the request the game application streaming system 136 can instantiate a client instance 140 for the user. In some embodiments, the dynamic client 112 may communicate with the interactive computing system 130 or another management plane layer, which can be configured to provide instructions to the game application streaming system 136 to instantiate a client instance 140 on behalf of the user computing system 102. The client instance 140 can execute the game application 110, in the same manner that the game application 110 is executed on a user computing system 102. The client instance 140 executes the simulation and presentation of the game application 110. The presentation of the game application 110 can be output as a video stream. In some embodiments, the output from the presentation engine may be further encoded for transport to the user computing system 102 as a video stream. The dynamic client 112 is configured to display a user interface of the game application 110 on the user computing system 102. The user interface can be the same user interface displayed as displayed on a user computing system 102 with the game installed locally. In some embodiments, the UI on the user computing system 102 may include additional features for interfacing with features of the dynamic client 112.

The dynamic client 112 provides an interface that can be used to receive user inputs for the game application 110. The dynamic client 112 can be configured to receive user input from a user input device (e.g., controller, mouse and keyboard, and the like). The dynamic client 112 can provide the user input to the client instance 140. The simulation engine 120 of the client instance 140 can process the user input and generate the state of the game application 110, which is then output for the presentation engine 124 to render frames for the game application 110. The rendered frames can be encoded for transport over the network and displayed as a video stream on the video player of the dynamic client 112. The dynamic client 112 can display the video stream provided to the user as it is received from the client instance 140. The client instance 140 can continue to stream video as long as the dynamic client 112 remains in phase 1.

If the dynamic client 112 is going to transition to phase 2, the game application streaming system 136 can transfer game application 110 assets for the user computing system 102. The game application 110 assets include assets that are used by the dynamic client 112 to execute the presentation engine 124 on the user computing system 102. After a sufficient number of assets are loaded onto the user computing system 102 for the dynamic client 112 to implement the presentation engine 124, the dynamic client 112 can transition to phase 2.

During phase 2, the dynamic client 112 is configured to execute the presentation engine using the computing resources of the user computing system 102. The simulation engine 120 continues to be executed by the client instance 140. After a sufficient number of game application 110 assets are loaded on the user computing system 102, the user computing system 102 can implement and begin executing the presentation engine 124. The execution of the presentation engine 124 can begin by backfilling the SSDPs that are generated by the simulation engine 120. The presentation engine 124 may receive the SSDPs from the state stream. The state stream may be executed on the client instance 140, the user computing system 102 and/or on both systems. The state stream provides the interface by which the user computing system 102 can acquire the SSDPs. The SSDPs are sent over the network so that they can be accessible and read by the presentation engine 124. The presentation engine 124 can be configured to request the SSDPs over the network or access a local state stream on the user computing system 102. In some embodiments, during the transition from phase 1 to phase 2, the simulation engine can simultaneously write the SSDP to the state stream queue on the client instance and to a network state stream queue that is configured to encode and transmit the SSDPs over the network to the user computing system 102. After receipt by the user computing system, the SSDPs are written to a state stream on the user computing system. The presentation engine can then read the SSDPs from user computing systems 102 state stream.

After the presentation engine 124 has been filled with necessary SSDPs for execution of the presentation of the game application 110. The presentation engine 124 on the user computing system 102 can begin executing concurrently with the presentation engine 124 on the client instance 140. The video-player on the user computing system 102 can also continue to operate concurrently with the presentation engine 124 on the user computing system 102. Once the presentation engine 124 is fully operational using the resources of the user computing system 102, the presentation engine 124 on the user computing system 102 replaces the presentation engine 124 on the game application streaming system 136 as the active presentation engine 124. The video player can stop execution and rendered framed generated by the presentation engine 124 on the user computing system 102 replace the video frames played by the video player. In some embodiments, when the presentation engine on the user computing system 102 takes over, the rendered frame displayed by the presentation engine 124 on the user computing system 102 is the next frame in the sequence for display by the video player. In some embodiments, the rendered frame displayed by the presentation engine 124 on the user computing system 102 is substantially the next frame for display by the video player, for example the frame can be a previous or subsequent frame that is scheduled to occur within 1 or 2 seconds of frames sequenced for display by the game application streaming system 136. The frame may be a frame that is generated from the same SSDP as that of the subsequent video frame scheduled for display on the video player. After the presentation engine 124 of the user computing system 102 becomes active, the client instance 140 presentation engine 124 becomes inactive. Additionally, the simulation engine can stop writing the SSDPs to the state stream and only write to the network state stream queue. Operation of the user computing system 102 in phase 2 reduces the computing load on the client instance 140 because the client instance 140 presentation engine 124 becomes inactive during phase 2 and stops rendering frames. The user computing system 102 presentation engine 124 becomes the active presentation engine 124 and continues to receive the SSDPs from the client instance 140 simulation engine 120 through the network state stream queue.

By transferring the presentation engine 124 to the user computing system 102, the user computing system 102 is able to perform activities within the virtual environment that do not change the state, but can change a point of view displayed to the user within the virtual environment. Since the presentation engine 124 is capable of rendering an entire scene based on the state at the time that the SSDP was created. In some instances, the user's point of view within the virtual environment may be manipulated without requiring an instruction to be generated by the simulation engine 120, such as when a change in point of view does not change the state of the game. For example, a virtual character jumping within a video game would change the state of the game and require the jump user input be sent to the simulation engine 120 in order to generate another SSDP so that the presentation engine 124 can render frames based on the updated state information. However, if a virtual character, merely changed the viewpoint from looking at a ceiling within a room to looking at the floor within the room, then this may not change the state of the virtual character. Rather, it would only change the viewpoint within the virtual environment. Since the state of the virtual environment is already included with the SSDP, the presentation engine 124 could render the frames quicker than would be required to send the change in viewpoint action to the client instance 140, then render the frames associated look action provide the updated frames back to the user computing system 102. This process of updating the render based on non-state changing user inputs can reduce the latency that the user experiences when playing the game application 110. Additionally, in virtual reality environments, where the viewpoint of the user is based on the position of the user's head, rendering on the presentation engine 124 can be significantly important in reducing latency to a tolerable level that will help to reduce the chance that they user will experience motion sickness or nausea.

In some applications, it can be preferable to remain in phase 2. For example, if the game server is actively updating the state of the virtual characters in a multiplayer game, it could help to reduce latency if the simulation engine 120 could have a better connection to the application host system 132. Additionally, it may be useful in order to help prevent cheating during games. Since none of the simulation is being performed on the user computing system 102, it can be difficult for a user to cheat during a game. Only the user inputs would be received by the computing system. It can be more difficult to spoof or hack the system when the control that the character has over the outputs that are being provided to the server is limited to user inputs.

In some embodiments, the client instance 140 can continue to monitor the framerate of the user computing system 102 after the system transitions to phase 2 in order to guarantee that the quality level of the user computing system 102 is satisfactory. For example, the client instance 140 may evaluate the framerate to determine whether the framerate generated by the user computing system 102 presentation engine 124 is meeting a minimum threshold for execution of the game application 110. For example, the minimum framerate may be 30 FPS, 60 FPS, or another value. The threshold may be a percentage difference of the framerate achieved in phase 1.

If the user computing system 102 is to transition to phase 3, the client instance 140 can continue to transfer game application 110 assets to the user computing system 102 during phase 2. The game application streaming system 136 will continue to transfer assets until the game application 110 is completely loaded onto the user computing system 102. Once the game asset load is complete. The user computing system 102 will execute the simulation engine 120 and activate it so that it is operating concurrently with the active simulation engine 120 on the client instance 140. The client instance 140 can transfer execution of the client instance 140 simulation engine 120 and the entire client architecture to the dynamic client 112 of the user computing system 102. The transfer of execution of the simulation engine 120 causes the user computing system 102 simulation engine 120 to become the active simulation engine 120, and the client instance 140 simulation engine 120 to become inactive. On the user computing system 102, the simulation engine 120 is executing concurrently with the client instance 140 simulation engine 120, such that substantially the same state data is being generated for the user computing system 102 presentation engine 124. When the execution of the simulation engine 120 transfers to the user computing system 102, all client architecture activities being executed by the client instance 140 transfer to the user computing system 102, such that the user computing system 102 is no longer active. Communications between the game servers and the client instance 140 are handed off from the client instance 140 to the user computing system 102.

As the client instance 140 winds down execution of the game application 110 and stops execution of the client instance 140 completely. In some embodiments, the client instance 140 may continue to monitor the user computing system 102 and execute for a determined amount of time in order to verify that the game application 110 continues to execute without problems. This can be a change that is opaque to the user such that the dynamic client 112 transitions during runtime of the game session without requiring any interaction from the user. The transition to the client instance 140 to the user computing system 102 may increase gameplay quality, frame quality and/or resolution of the presentation of the game application 110. The transition can reduce display latency between user input and display response. The interactive computing system 130 receives gameplay data from the user computing system 102 that was previously provided by the client instance 140. The interactive computing system 130 provides gameplay data to the user computing system 102 based on the user computing system 102 interaction with the gameplay server(s). Gameplay data communicated to the server 135 can refer to any type of communication that a game application 110 would have with a server during operation of the game application on the client. In phases 1 and 2, this type of communication is handled by the client instance and in phase 3 it is handed off to the user computing system 102. The user computing system 102 continues to execute the game application 110 as a standalone game application 110, such as illustrated with respect to user B computing system illustrated in FIG. 1.

Dynamic Client Execution

Figure 5A:
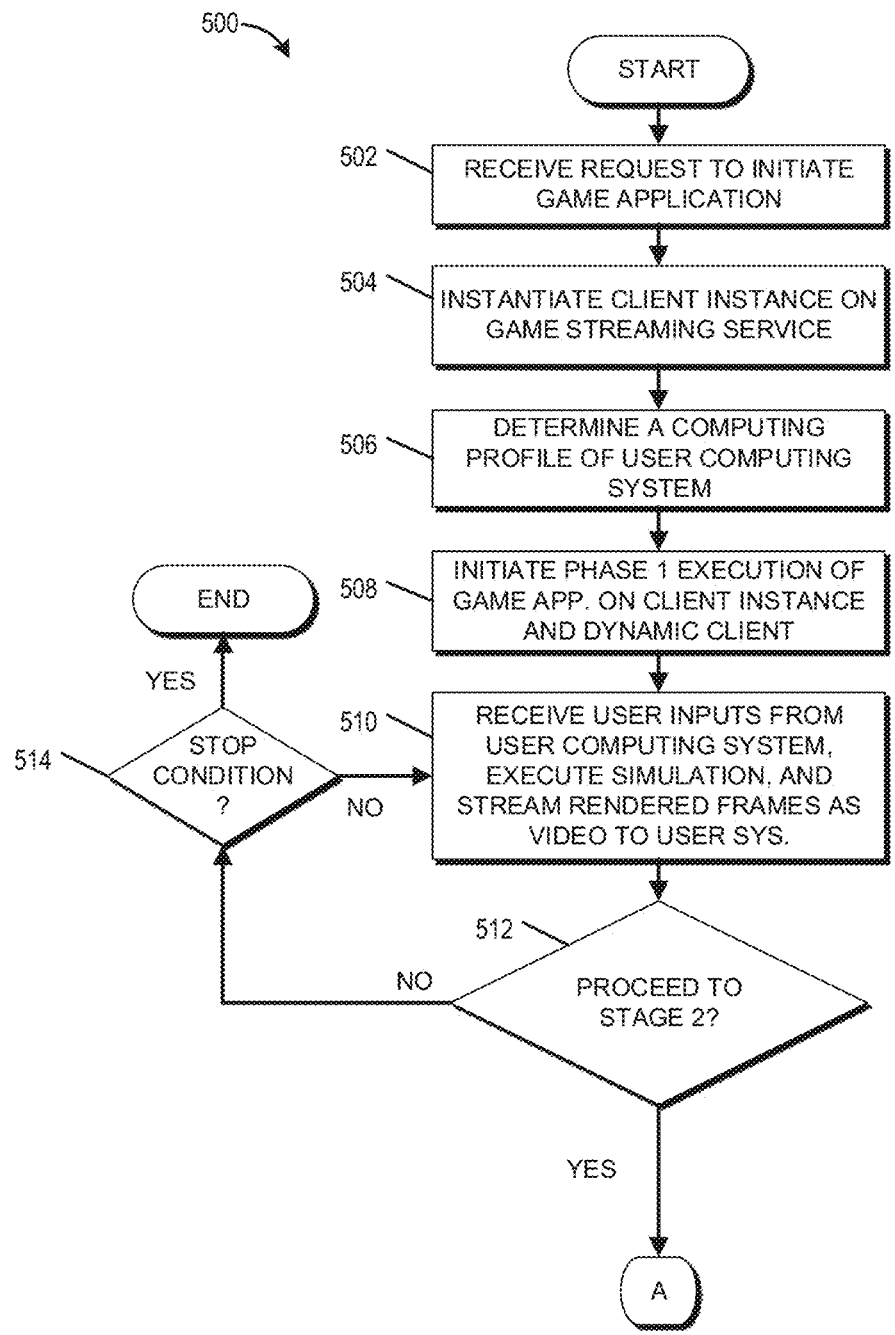
FIGS. 5A-5C illustrate an embodiment of a flowchart of a process for executing a game application using a dynamic streaming video game client.
Figure 5B:
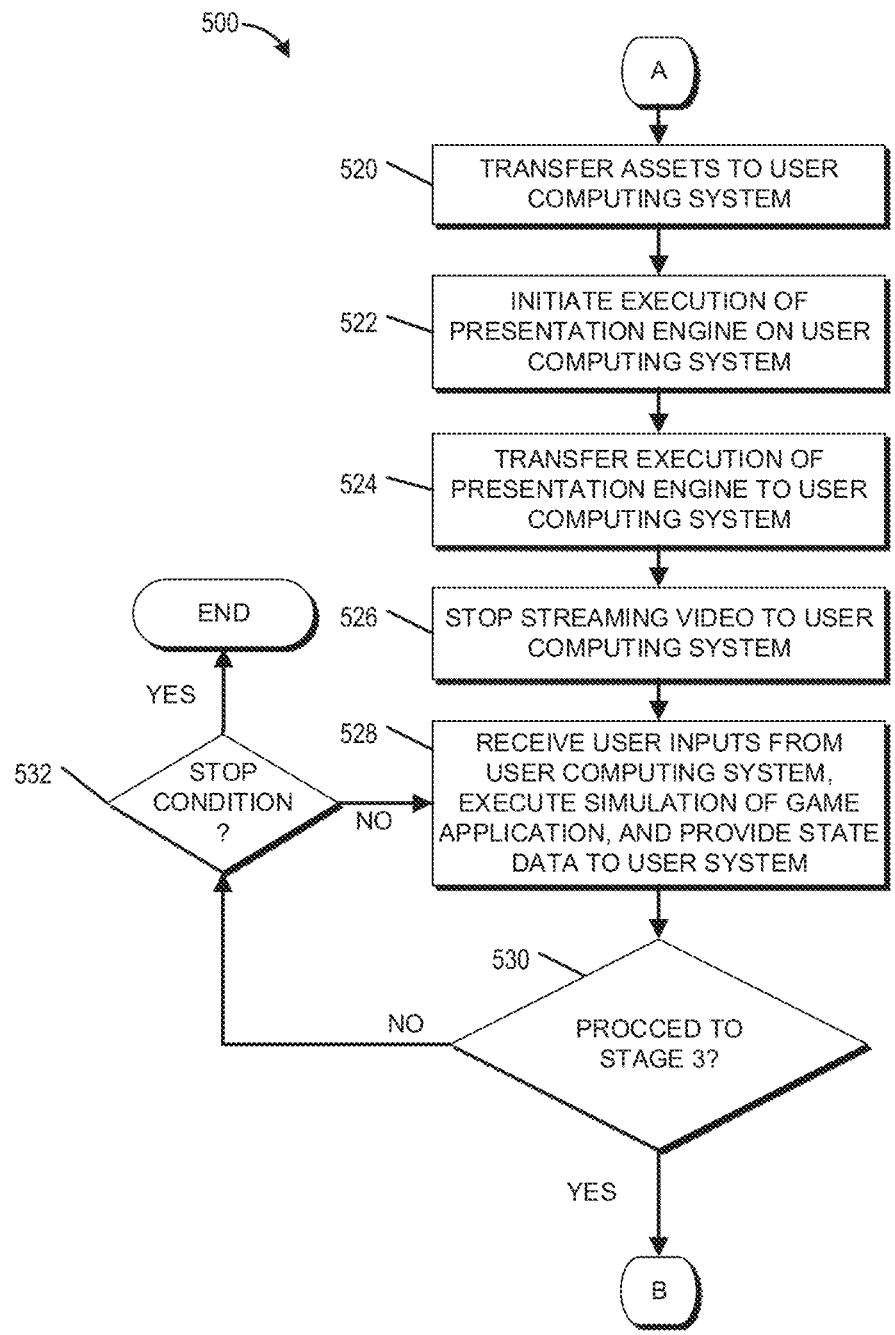
Figure 5C:
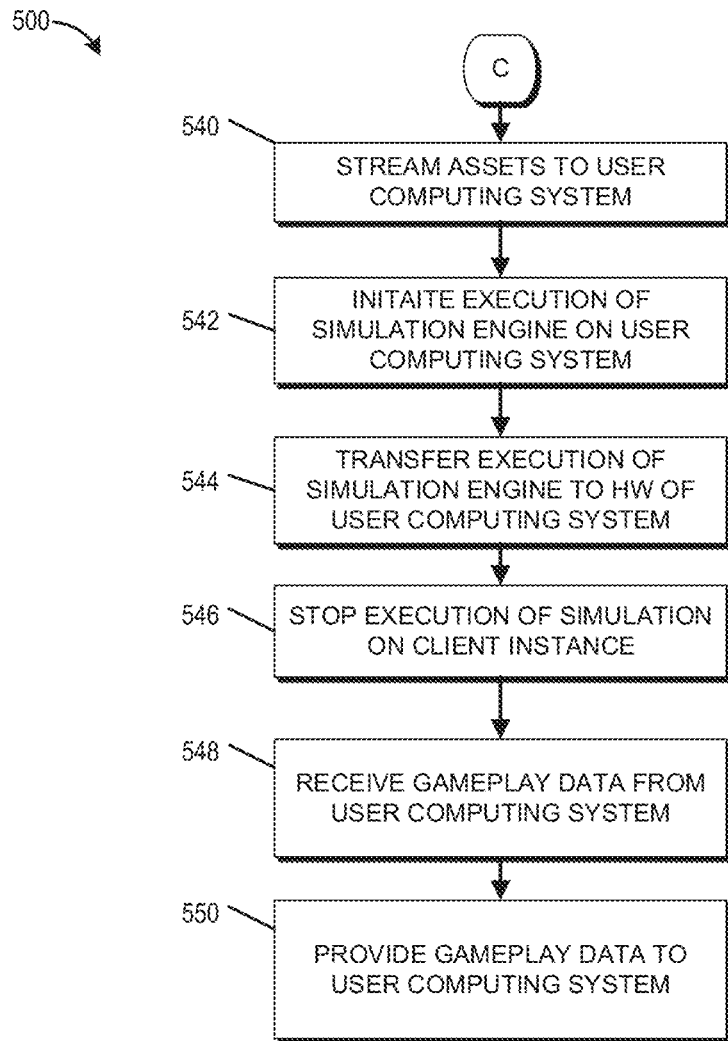
Figure 6:
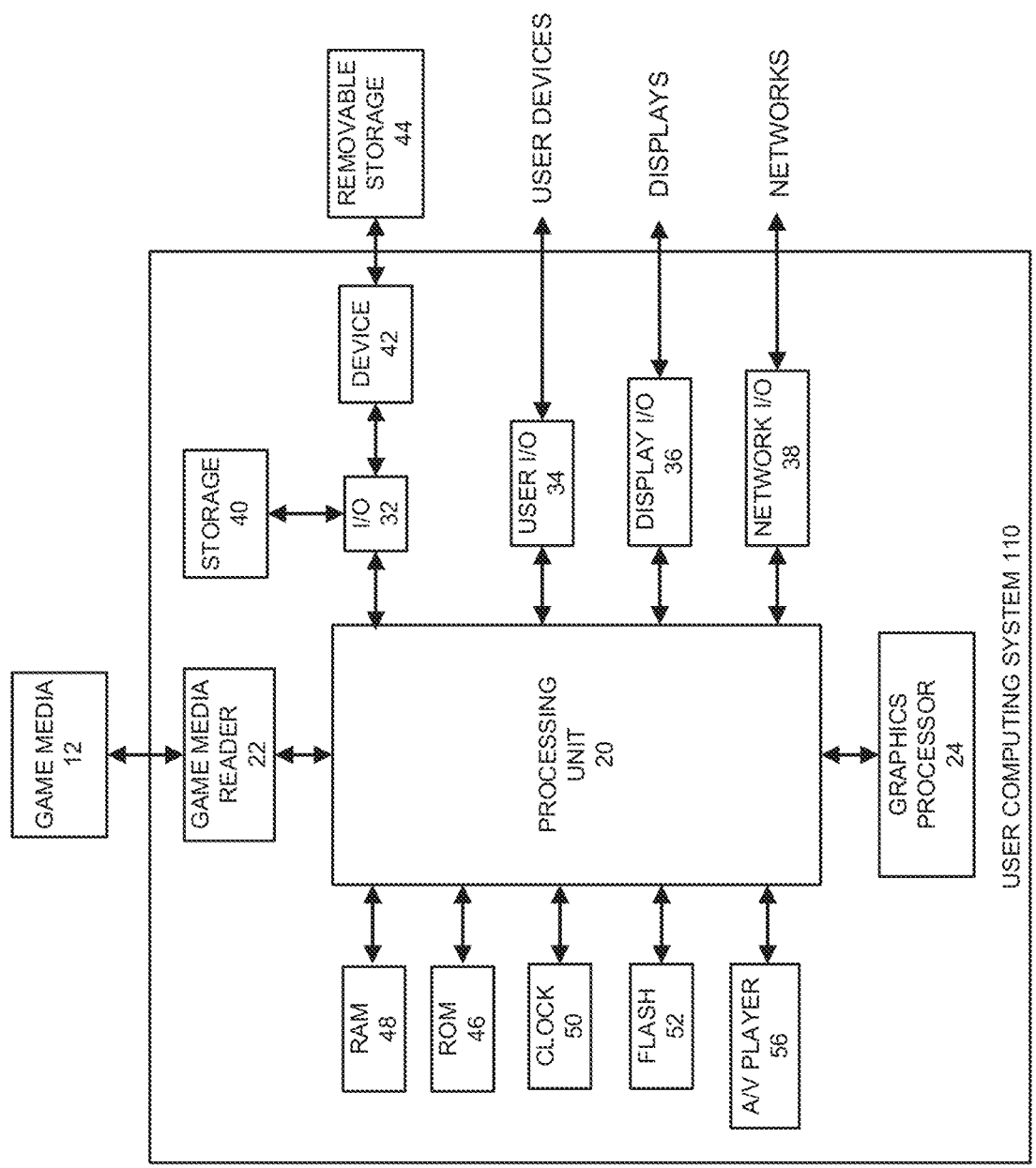
FIG. 6 illustrates an embodiment of a computing device.

FIGS. 5A-5C illustrate embodiments of flowcharts of process 500 for executing a game application using a dynamic client. The processes, in whole or in part, can be implemented by CPUs and/or GPUs configured with computer readable instructions to execute a game application on a server (e.g., interactive computing system 130) communicating with a client (e.g., user computing system 102) over a network. For example, the processes, in whole or in part, can be implemented by the game application 110, game application client 112, state stream game engine 120, simulation engine 122, state stream 126, the presentation engine 126, interactive computing system 130, game application host system 134, game server(s) 135, game application streaming system 136, and/or client instance 140. Although any number of systems, in whole or in part, can implement the processes, to simplify discussion, the processes will be described with respect to the interactive computing system 130 and components thereof.

With specific reference to FIG. 5A, at block 502, the interactive computing system 130 receives a request to initiate a game application 110 on a user computing system 102. The request can come from a dynamic client 112 executing on the user computing system 102. In some embodiments, the request may come from another application on the user computing system 102, such as a browser application. In some embodiments, the browser application may be instructed to initiate a download of the dynamic client 112 in order to continue the process of playing the game application. In some embodiments, the browser application may function as the dynamic client 112 for at least a portion of the process 500.

At block 504, the interactive computing system 130 instantiates a client instance on the game application streaming system 136. The instantiation of the client instance 140 on the game application streaming system 136 can be the instantiation of a virtual machine executing on the game application streaming system 136 and running the appropriate operating systems and applications required for execution of the game application 110 and for interfacing with the user computing system 102. The client instance 140 instantiated on the game application streaming system 136 can be a logically separate service within the interactive computing system 130 from the application host system 132. The interactive computing system 130 may include an application host system that include one or more game servers 135 configured to execute server-side functionality of the game application 110. The client instance 140 can communicate with the game servers(s) as if they were a user computing system 102 executing outside of the interactive computing system 130. For example, in a multiplayer first-person shooter, the application host system 132 may host online multiplayer games on the game servers 135 for a plurality of different users to play against each other.

At block 506, the interactive computing system 130 can be configured to determine a computing profile of the user computing system 102. The computing profile can identify hardware resources (such as, CPU resources, GPU resources, memory, and other hardware resources), firmware information, device driver information, software information (such as operating system, browser type, software installed, software versions, and other software information), network information (such as, IP address, latency, bandwidth, and other network information), and other information associated with the user computing system 102. The computing profile can be used to determine the how the dynamic client will be used on the user computing system 102. For example, compatibility with games and phases of execution of the dynamic client 112.

At block 508, the interactive computing system 130 initiates execution of the game application on the client instance 140 and the dynamic client 112. The game is executed using the hardware resources of the client instance 140. The execution of the game application on the client instance 140 may be the same as if the game were executing on user computing system 102 of user B in FIG. 1 with the exception that the rendered frames would be provided to the user computing system 102 from the client instance 140. The user interface of the dynamic client 112 can be a video player that appears to have the same functionality as the user interface of the game application executing on the user computing system 102 of User B. For example, though, the interface is a video stream of the game application, elements of the user interface displayed within the video stream provide the same functionality if the user selects the portion of the UI associated with the UI element.

At block 510, the interactive computing system 130 receives user inputs from the user computing system 102 to interface with the game application 110. The user inputs are received over the network from the dynamic client 112. The game application 110 of the client instance 140 executes the simulation of the game application 110 based at least in part on the inputs. The simulation may be executed by the simulation engine 120 of the state stream engine 120. The simulation engine 120 generates state data based on the execution of the simulation provides the state data for presentation by the presentation engine 124. The presentation engine 124 can render frames for output within the dynamic client 112 as a video stream of frames, such as at a defined rate. For example, the rendered video stream of frames output by the presentation engine 124 may be set at a specific rate, such as 30 FPS, 60 FPS, or another rate. The frames may be rendered as fast as possible and may be provided to the user computing system 102 at a variable framerate. In some embodiments, the rate at which the frames within the video stream are provided may be a function of the bandwidth and network latency between the user computing system 102 and the game application streaming system 136. The interactive computing system 130 and dynamic client 112 can continue to execute the game application 110 in phase 1.

At block 512, the interactive computing system 130 determines whether the dynamic client 112 will proceed to phase 2. The determination of whether to proceed to phase 2 can depend on various factors, such as hardware resources, game compatibility, game characteristics, user preferences, network characteristics, and other factors that determine whether to migrate some of the processing of the game application 110 to the user computing system 102. If the interactive computing system 130 determines that the dynamic client 112 will proceed to phase 2, the process proceeds to B, and on to block 520. If the interactive computing system 130 determines that the dynamic client 112 will not proceed to phase 2, the process proceeds to block 514 to determine whether a stop condition has been reached. If a stop condition has been satisfied, the process ends, and the client instance 140 can be ended. The user/game data that is associated with the account of the user can be stored in with the user account. For example, game achievements and same game files associated with the game application 110 can be saved for the user such that the game can be resumed without losing progress even though the client instance 140 initially used by the user has been ended.

With reference now to FIG. 5B, at block 520, the game application streaming system 136 can transfer game application 110 assets to the user computing system 102 in order for the user computing system 102 to execute the presentation engine 124. The game application streaming system 136 can prioritize the game application 110 assets that are needed for execution of the presentation engine 124 on the dynamic client 112. After all of the necessary assets for the execution of the presentation engine 124 on the user computing system 102 have been provided, the process can proceed to block 522.

At block 522, the game application streaming system 136 can initiate execution of the presentation engine 124 on the user computing system 102. The presentation engine 124 can be configured to executed and activated by the dynamic client 112 concurrently with the presentation engine 124 on the client instance 140. The game application streaming system 136 can provide the state data that is used by the client instance 140 presentation engine 124 in order to generate and render frames. The user computing system 102 presentation engine 124 may receive the SSDPs the client instance. For example, the simulation engine may write the SSDPs to a network state stream queue, which are then encoded and written to a state stream on the user computing system 102. The presentation engines 124 on the user computing system 102 and client instance 140 can continue to operate concurrently until the game application streaming system 136 determines that the presentation engine 124 on the user computing system 102 is operating at full capacity and is substantially in sync with the client instance 140 presentation engine 124. At this point the process proceeds to block 524.

At block 524, the game application streaming system 136 can transfer execution of the client instance 140 presentation engine 124 to the user computing system 102 presentation engine 124. The transfer of execution of the presentation engine 124 causes the user computing system 102 presentation engine 124 to become the active presentation engine 124, and the client instance 140 presentation engine 124 to become inactive. On the user computing system 102, the presentation engine 124 is executing concurrently with the video player, such that substantially the same frames are being provided by the video stream and rendered by the user computing system 102 presentation engine 124.

At block 526, the client instance 140 stops streaming video to the user computing system 102 and the user computing system 102 transitions from the video player to the frames being rendered by the user computing system 102 presentation engine 124. This can be a change that is opaque to the user such that the video-player is stopped without requiring any interaction from the user. The transition to the presentation engine 124 from the video player may increase frame quality and/or resolution of the presentation of the game application 110. The transition can reduce display latency between user input and display response.

At block 528, the interactive computing system 130 receives user inputs from the user computing system 102 to interface with the game application 110. The user inputs are received over the network from the dynamic client 112. The game application 110 of the client instance 140 executes the simulation of the game application 110 based at least in part on the inputs. The simulation may be executed by the simulation engine 120 of the state stream engine 120. The simulation engine 120 generates state data based on the execution of the simulation provides the state data for presentation by the user computing system 102 presentation engine 124. The user computing system 102 presentation engine 124 can render frames using the hardware resources of the user computing system 102 and output the for display on the user computing system 102. The framerate of the user computing system 102 may be based on the hardware resources of the user computing system 102 and may be increased over the any framerate limitations imposed by the client instance 140. For example, the state data provided by the simulation engine 120 to the user computing system 102 presentation engine 124 requires significantly less network bandwidth than the streaming of video. The frames may be rendered as fast as possible by the user computing system 102 at a variable framerate or at a defined rate. The interactive computing system 130 and dynamic client 112 can continue to execute the game application 110 in phase 2.

At block 530, the interactive computing system 130 determines whether the dynamic client 112 will proceed to phase 3. The determination of whether to proceed to phase 3 can depend on various factors, such as hardware resources, game compatibility, game characteristics, user preferences, network characteristics, and other factors that determine whether to migrate some of the processing of the game application 110 to the user computing system 102. If the interactive computing system 130 determines that the dynamic client 112 will proceed to phase 3, the process proceeds to C, and on to block 540. If the interactive computing system 130 determines that the dynamic client 112 will not proceed to phase 3, the process proceeds to block 532 to determine whether a stop condition has been reached. If a stop condition has been satisfied, the process ends, and the client instance 140 can be ended. The user/game data that is associated with the account of the user can be stored in with the user account. For example, game achievements and same game files associated with the game application 110 can be saved for the user such that the game can be resumed without losing progress even though the client instance 140 initially used by the user has been ended.

With reference now to FIG. 5C, at block 540, the game application streaming system 136 can transfer game application 110 assets to the user computing system 102 in order for the user computing system 102 to execute the simulation engine 120 and transition the entire client architecture from the client instance 140 to the user computing system 102. After all of the necessary assets for the execution of the simulation engine 120 and execution of the client architecture locally on the user computing system 102 have been provided, the process can proceed to block 542.

At block 542, the game application streaming system 136 can initiate execution of the simulation engine 120 on the user computing system 102. The simulation engine 120 can be configured to executed and activated by the dynamic client 112 concurrently with the simulation engine 120 on the client instance 140. The user computing system 102 can begin generating state data using the user computing system 102 simulation engine 120 based on the user input in order to generate and render frames. The user computing system 102 can continue to send user inputs to the client instance 140. The simulation engine 120$s$ on the user computing system 102 and client instance 140 will continue to operate concurrently until the game application streaming system 136 determines that the simulation engine 120 on the user computing system 102 is operating at full capacity and is substantially in sync with the client instance 140 simulation engine 120. At this point the process proceeds to block 524.

At block 544, the game application streaming system 136 can transfer execution of the client instance 140 simulation engine 120 and the entire client architecture to the dynamic client 112 of the user computing system 102. The transfer of execution of the simulation engine 120 causes the user computing system 102 simulation engine 120 to become the active simulation engine 120, and the client instance 140 simulation engine 120 to become inactive. On the user computing system 102, the simulation engine 120 is executing concurrently with the client instance 140 simulation engine 120, such that substantially the same state data is being generated for the user computing system 102 presentation engine 124. When the execution of the simulation engine 120 transfers to the user computing system 102, all client architecture activities being executed by the client instance 140 transfer to the user computing system 102, such that the user computing system 102 is no longer active. Communications between the game servers and the client instance 140 are handed off from the client instance 140 to the user computing system 102.

At block 546, the client instance 140 winds down execution of the game application 110 and stops execution of the client instance 140 completely. In some embodiments, the client instance 140 may continue to monitor the user computing system 102 and execute for a determined amount of time in order to verify that the game application 110 continues to execute without problems. This can be a change that is opaque to the user such that the dynamic client 112 transitions during runtime of the game session without requiring any interaction from the user. The transition to the client instance 140 to the user computing system 102 may increase gameplay quality, frame quality and/or resolution of the presentation of the game application 110. The transition can reduce display latency between user input and display response.

At block 548, the interactive computing system 130 receives gameplay data from the user computing system 102 that was previously provided by the client instance 140. At block 550, the interactive computing system 130 provides gameplay data to the user computing system 102 based on the user computing system 102 interaction with the gameplay server(s). The user computing system 102 continues to execute the game application 110 as a standalone game application 110, such as illustrated with respect to User B in FIG. 1.

Overview of Computing Device

FIG. 8 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for dynamically streaming a game application to a user computing system:
   by a server computing system comprising at least one hardware processor configured with computer executable instructions:
   receiving a request to initiate a streaming gameplay session of a game application, wherein the request is received from a thin client on a user computing system, wherein the game application is not locally installed on the user computing system;
   executing the game application on a first client instance, wherein the game application includes a first simulation engine configured to execute game logic that is configured to control simulation of a virtual environment, and a first presentation engine configured to render frames based on state data generated by the first simulation engine;
   initiating a remote streaming phase of the game application to the user computing system;
   during the remote streaming phase of the game application:
   receiving user inputs from the user computing system;
   generating, by the first simulation engine, state data based at least in part on the user inputs;
   rendering frames of the game application as a video based at least in part on the state data;
   transmitting the video to the user computing system for display within the thin client on the user computing system; and
   based on a determination that hardware computing resources of the user computing system satisfy requirements of a local execution phase, transferring assets to the user computing system to execute a second simulation engine and a second presentation engine on the user computing system;

based on a determination that the second presentation engine is executing on the user computing system, transferring execution of the first presentation engine to the second presentation engine within the game application;

based on a determination that the second simulation engine is executing on the user computing system, transferring execution of the first simulation engine to the second simulation engine within the game application;

stopping execution of the first presentation engine; and stopping execution of the first simulation engine and transferring control of the execution of the game application to the user computing system, wherein during the local execution phase of the game application, the second simulation engine is configured to execute using hardware computing resources of the user computing system, and the second presentation engine is configured to render frames using hardware computing resources of the user computing system based on state data generated by the second simulation engine.

2. The computer-implemented method of claim 1 further comprising, based on a determination that the hardware computing resources of the user computing system satisfy requirements of an intermediate streaming phase, executing the intermediate streaming phase after executing the second presentation engine and prior to executing of the second simulation engine, wherein during the intermediate streaming phase, the second presentation engine executes on the user computing system and the first simulation engine executes on the first client instance.

3. The computer-implemented method of claim 2 further comprising, during the intermediate streaming phase,
generating, by the first simulation engine, second phase state data based at least in part on the user inputs; and
transmitting the second phase state data generated by the first simulation engine to the user computing system for use by the second presentation engine, wherein the second presentation engine is configured to render frames for display of the execution of the game application based at least in part on the second phase state data generated by the first simulation engine.

4. The computer-implemented method of claim 3, further comprising writing the second phase state data to a network state stream queue and encoding the second phase state data for transfer over a network to a state stream on the user computing system.

5. The computer-implemented method of claim 3, wherein the first simulation engine on the first client instance executes independent of the second presentation engine in the user computing system, wherein the second presentation engine generates and renders frames independent of the first simulation engine that generated the second phase state data.

6. The computer-implemented method of claim 1, wherein the thin client is a web browser.

7. The computer-implemented method of claim 2, wherein during the intermediate streaming phase, the second presentation engine is configured to render portions of a virtual environment of the game application without requesting additional phase state data from the first simulation engine.

8. The computer-implemented method of claim 1, wherein the user computing system is a virtual reality system.

9. The computer-implemented method of claim 1, wherein during the remote streaming phase, the first client instance communicates with a video game server during the execution of the game application, and during the local execution phase, the user computing system communicates with a video game server during the execution of the game application.

10. The computer-implemented method of claim 1, wherein transitioning from the remote streaming phase to the local execution phase does not end the gameplay session of the game application.

11. A server computing system for dynamically streaming a game application to a user computing system:
by a one or more hardware processors configured with computer executable instructions that configure the server computing system to:
receive a request to initiate a streaming gameplay session of a game application, wherein the request is received from a thin client on a user computing system, wherein the game application is not locally installed on the user computing system;
execute the game application on a first client instance, wherein the game application includes a first simulation engine configured to execute game logic that is configured to control simulation of a virtual environment, and a first presentation engine configured to render frames based on state data generated by the first simulation engine;
initiate a remote streaming phase of the game application to the user computing system;
during the remote streaming phase of the game application:
receive user inputs from the user computing system;
generate, by the first simulation engine, state data based at least in part on the user inputs;
render frames of the game application as a video based at least in part on the state data;
transmit the video to the user computing system for display within the thin client on the user computing system; and
based on a determination that hardware computing resources of the user computing system satisfy requirements of a local execution phase, transfer assets to the user computing system to execute a second simulation engine and a second presentation engine on the user computing system;
based on a determination that the second presentation engine is executing on the user computing system, transfer execution of the first presentation engine to the second presentation engine within the game application;
based on a determination that the second simulation engine is executing on the user computing system, transfer execution of the first simulation engine to the second simulation engine within the game application;
stop execution of the first presentation engine; and
stop execution of the first simulation engine and transferring control of the execution of the game application to the user computing system,
wherein during the local execution phase of the game application, the second simulation engine is configured to execute using hardware computing resources of the user computing system, and the second presentation engine is configured to render frames using hardware computing resources of the user computing system based on state data generated by the second simulation engine.

12. The system of claim 11, wherein, based on a determination that the hardware computing resources of the user computing system satisfy requirements of an intermediate streaming phase, execute the intermediate streaming phase after executing the second presentation engine and prior to executing of the second simulation engine, wherein during the intermediate streaming phase, the second presentation engine executes on the user computing system and the first simulation engine executes on the first client instance.

13. The system of claim 12, wherein during the intermediate streaming phase,
generate, by the first simulation engine, second phase state data based at least in part on the user inputs; and
transmit the second phase state data generated by the first simulation engine to the user computing system for use by the second presentation engine, wherein the second presentation engine is configured to render frames for display of the execution of the game application based at least in part on the second phase state data generated by the first simulation engine.

14. The system of claim 13, wherein the first client instance is further configured to write the second phase state data to a network state stream queue and encode the second phase state data for transfer over a network to a state stream on the user computing system.

15. The system of claim 13, wherein the first simulation engine on the first client instance executes independent of the second presentation engine in the user computing system, wherein the second presentation engine generates and renders frames independent of the first simulation engine that generated the second phase state data.

16. The system of claim 11, wherein the thin client is a web browser.

17. The system of claim 12, wherein during the intermediate streaming phase, the second presentation engine is configured to render portions of a virtual environment of the game application without requesting additional phase state data from the first simulation engine.

18. The system of claim 11, wherein the user computing system is a virtual reality system.

19. The system of claim 11, wherein during the remote streaming phase, the first client instance communicates with a video game server during the execution of the game application, and during the local execution phase, the user computing system communicates with a video game server during the execution of the game application.

20. The system of claim 11, wherein transitioning from the remote streaming phase to the local execution phase does not end the gameplay session of the game application.

* * * * *